(12) United States Patent  
Lamba et al.

(10) Patent No.: US 10,642,521 B2  
(45) Date of Patent: May 5, 2020

(54) SCALING DISTRIBUTED QUEUES IN A DISTRIBUTED STORAGE NETWORK

(71) Applicant: International Business Machines Corporation, Armonk, NY (US)

(72) Inventors: Amit H. Lamba, Buffalo Grove, IL (US); Daniel J. Scholl, Chicago, IL (US); Jason K. Resch, Chicago, IL (US); Brian F. Ober, Lake in the Hills, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 15/977,434

(22) Filed: May 11, 2018

(65) Prior Publication Data

US 2019/0347005 A1    Nov. 14, 2019

(51) Int. Cl.
  *G06F 3/06* (2006.01)
  *G06F 11/07* (2006.01)

(52) U.S. Cl.
  CPC ............ *G06F 3/064* (2013.01); *G06F 3/0607* (2013.01); *G06F 3/067* (2013.01); *G06F 3/0619* (2013.01); *G06F 11/0727* (2013.01)

(58) Field of Classification Search
  CPC .... G06F 11/0727; G06F 3/067; G06F 3/0607; G06F 3/064; G06F 3/0619
  See application file for complete search history.

(56) References Cited

U.S. PATENT DOCUMENTS

| | | | | |
|---|---|---|---|---|
| 2008/0151724 A1* | 6/2008 | Anderson | ........... | G06F 11/1471 369/53.42 |
| 2015/0113317 A1* | 4/2015 | Ouyang | .............. | G06F 11/1451 714/6.3 |
| 2015/0356019 A1* | 12/2015 | Johar | ................... | G06F 12/0871 711/142 |
| 2016/0170639 A1* | 6/2016 | Velayudhan | ............ | G06F 3/061 711/114 |
| 2016/0224422 A1 | 8/2016 | Resch et al. | | |
| 2016/0224603 A1* | 8/2016 | Yang | ..................... | H04L 12/413 |
| 2017/0054806 A1* | 2/2017 | Dhuse | ..................... | G06F 21/00 |
| 2017/0090824 A1 | 3/2017 | Tamborski | | |
| 2019/0294582 A1* | 9/2019 | Zhu | ......................... | G06F 3/061 |

* cited by examiner

*Primary Examiner* — Guy J Lamarre
(74) *Attorney, Agent, or Firm* — James Nock; Andrew D. Wright; Roberts Calderon Safran & Cole, P.C.

(57) ABSTRACT

A method begins with a computing device of a distributed storage network (DSN) being designated to process a write request from a Decentralized, or Distributed, Agreement Protocol (DAP) and continues with the computing device retrieving a current policy for the storage units (SUs) associated with the write request, where the current policy specifies the current connectivity for the SUs. The method continues by using the current policy to configure a data structure to process the write request, where the data structure is based on scaling triggers and a load balancing scheme. The method continues with the data structure incorporating a primary queue and scaling the addition of secondary queues based on the scaling triggers and/or the load balancing scheme.

20 Claims, 18 Drawing Sheets distributed, or dispersed, storage network (DSN) 10

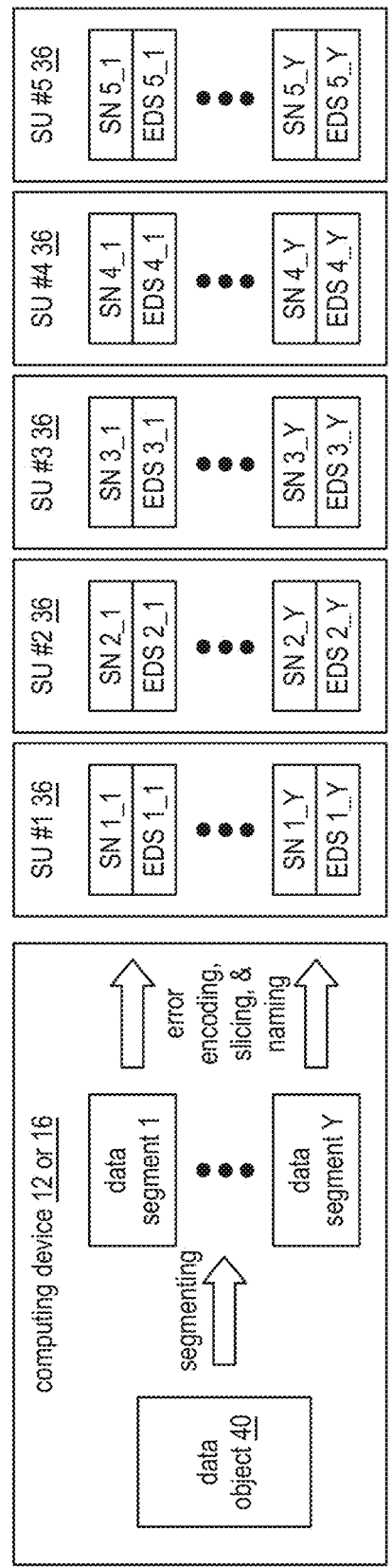
FIG. 14
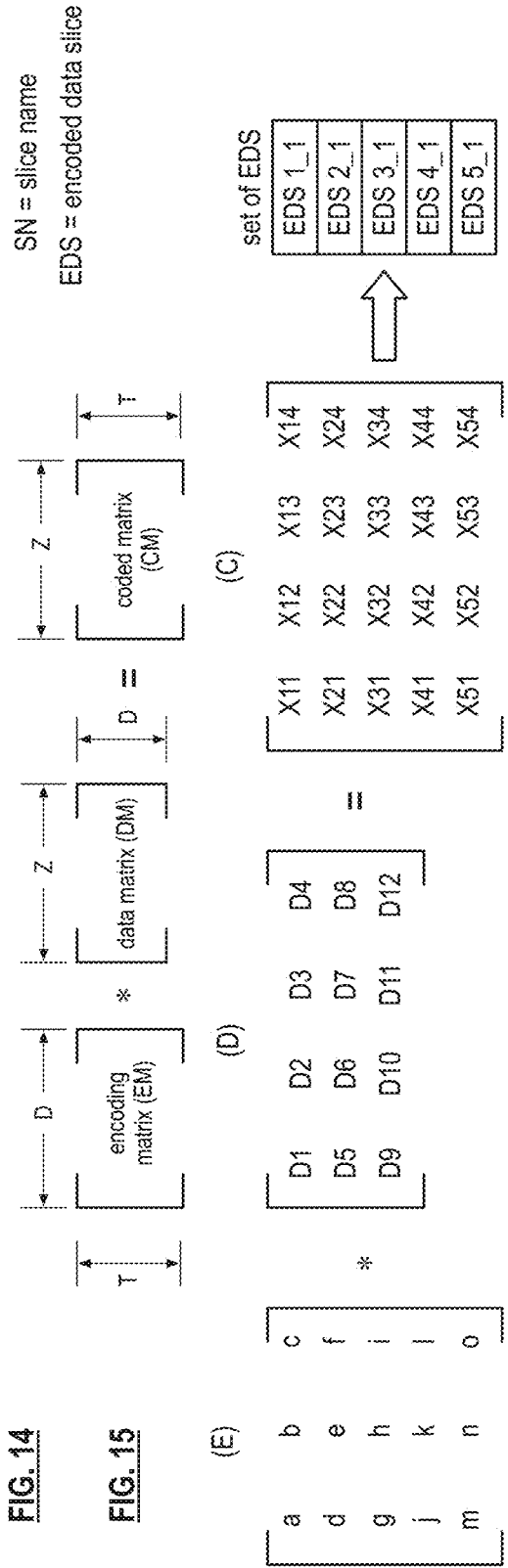
FIG. 15
FIG. 16
FIG. 17

SCALING DISTRIBUTED QUEUES IN A DISTRIBUTED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

This invention relates generally to computer networks and more particularly to data movement between processing units in distributed storage networks.

Distributed storage networks support data movement between distributed storage units in order to provide increased reliability, reduced latency, etc. Data movement may utilize a distributed priority queue framework and in order to reduce contention between nodes of the framework data movement between nodes may be assigned to delegated processing devices deployed across the network. When data items are added or deleted from ends (head and tail) of a given queue an associated processing device may end up being a bottleneck in the queue and limit throughput.

The prior art does not provide adequate means to alleviate bottlenecks associated with such queues. Additionally, prior art fails to provide adequate tracking of individual and collective queues distributed across distributed storage networks.

SUMMARY

Embodiments of the present invention disclose a computer-implemented method, a system, and a computer program product for providing a data structure utilizing multiple queues for data movement between distributed storage units. A novel data structure provides for dynamic scaling of the number of queues available by delegate processing units in a distributed storage network DSN). A decentralized agreement protocol (DAP) delegates writes to index nodes of the distributed storage network, in order to minimize contention on the nodes. Data movement utilizes a distributed priority queue framework based on a distributed index.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 14 is a schematic block diagram of an example of dispersed storage error encoding of data in accordance with the present invention;

FIG. 15 is a schematic block diagram of a generic example of an error encoding function in accordance with the present invention;

FIG. 16 illustrates a specific example of Cauchy Reed-Solomon encoding in accordance with a distributed agreement protocol;

FIG. 17 is a schematic block diagram of an example of a slice name of an encoded data slice (EDS) in accordance with the present invention;

DETAILED DESCRIPTION OF THE INVENTION

According to an embodiment of the present invention, a novel data structure provides dynamic scaling of the number of queues available by delegate processing units in a distributed storage network (DSN). A distributed priority queue framework based on a distributed index facilitates data movement between nodes of distributed storage (DS) units in DSN memory, where a decentralized agreement protocol (DAP) minimizes contention on index nodes of the DSN by delegating writes to the nodes. In an example, the delegate processing units incorporate multiple queues in a data structure (such as a pipe or conduit) for two nodes between which data movement is desired, where the number of queues dynamically, based on a policy that defines the characteristics of the pipe.

Figure 1:
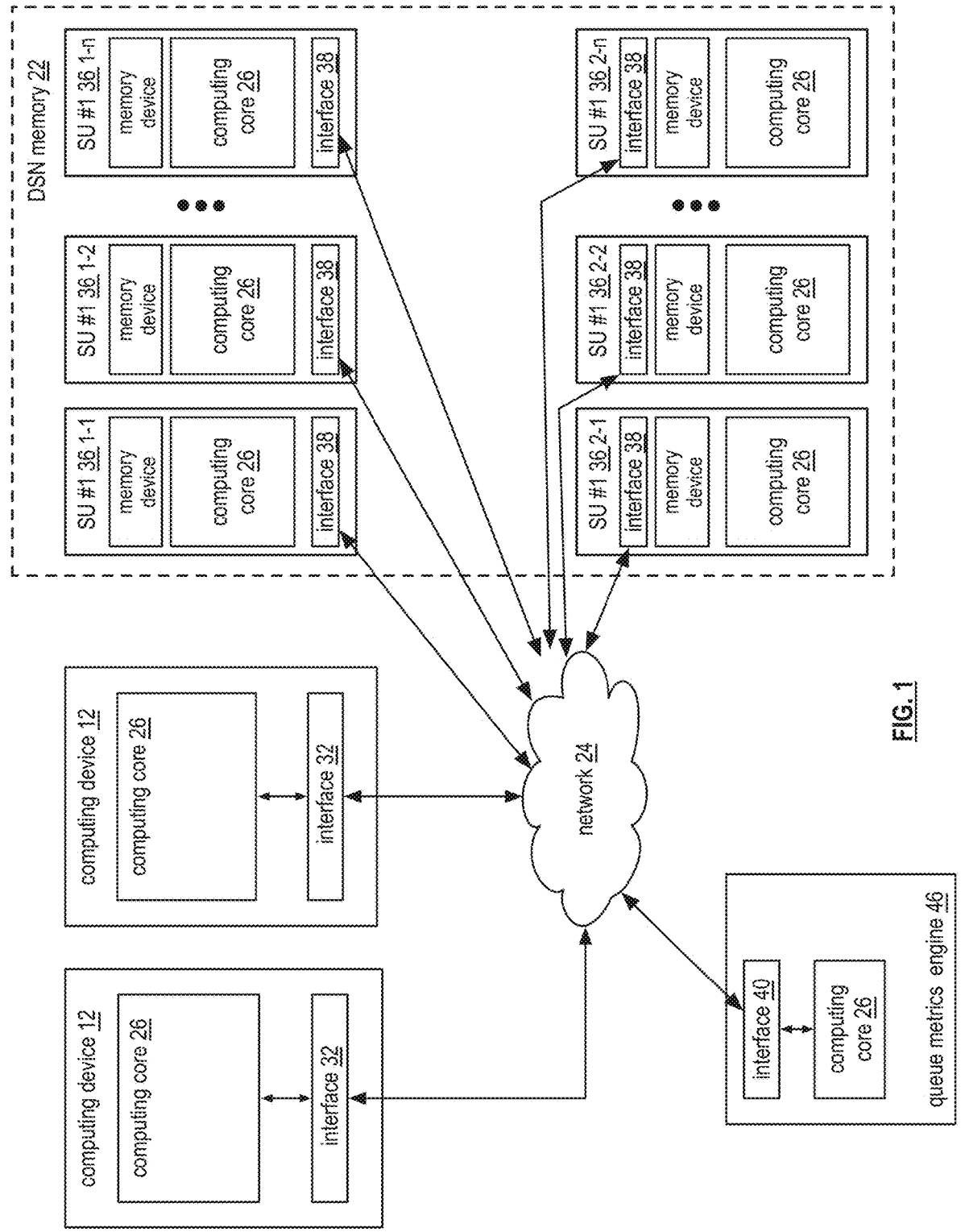
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) that includes a plurality of computing devices 12, a queue metrics engine 46, and a DSN memory 22. The plurality of computing devices 12, queue metrics engine 46, and DSN memory 22 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of computing devices 12, queue metrics engine 46, and storage units (SUs) 36 include a computing core 26, which includes network interfaces 32, 46, and 38, respectively. Computing devices 12 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Computing device 12 may also include DS client module 34, as further illustrated in FIGS. 12-16. Note that the queue metrics engine 46 may be a common computing device, and/or may be integrated into one or more of the computing devices 12-16 and/or into one or more of the storage units 36.

Each interface 32, 40, and 38 includes software and hardware to support one or more communication links via the network 24 indirectly and/or directly. For example, interface 32 supports a communication link (e.g., wired, wireless, direct, via a LAN, via the network 24, etc.) between computing devices 12. As another example, interface 32 supports communication links (e.g., a wired connection, a wireless connection, a LAN connection, and/or any other type of connection to/from the network 24) between computing devices 12 and DSN memory 22.

Figure 2:
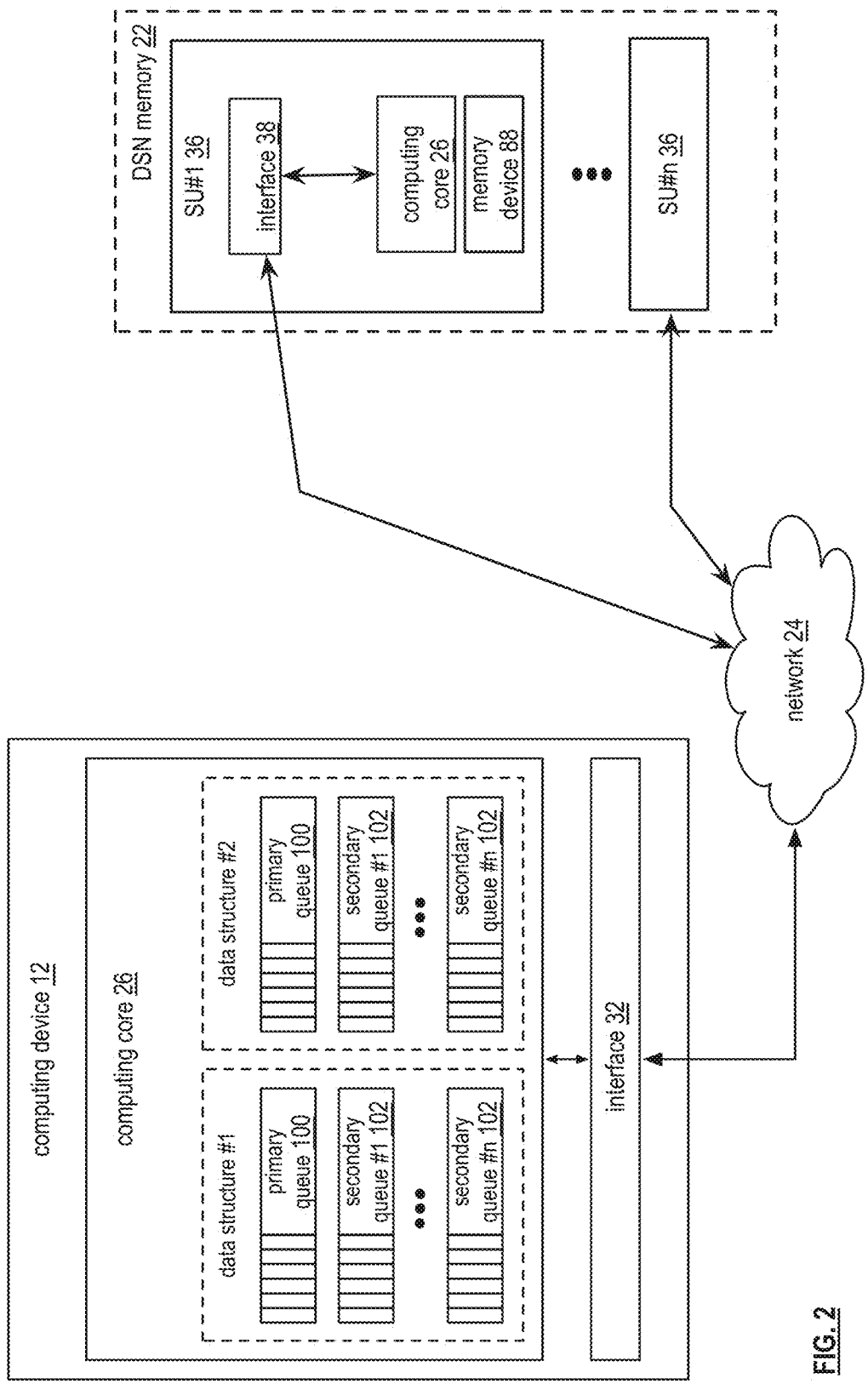
FIG. 2 is a schematic block diagram of an embodiment of a data structure in a DSN in accordance with the present invention.

FIG. 2 is another schematic block diagram of an embodiment of a DSN, illustrating a portion of the embodiment of FIG. 1 including the use of data structures incorporating multiple queues for moving data between SU. In an embodiment, computing device 12 is delegated to process one or more write requests between elements of the DSN using a decentralized agreement protocol (DAP), as further illustrated in FIGS. 8-11. The movement of data between DSN processing units utilizes a distributed priority framework based on a distributed index; in order to minimize contention on index nodes write request processing may be delegated to one or more computing devices, such as computing device 12, queue metrics engine 46 and/or SUs 36 according to the DAP. As shown in FIG. 2, the computing core 26 may incorporate one or more data structures #1 and #2, etc. In an embodiment, a data structure, such as data structure #1 from FIG. 2, of the now delegate computing device 12 maintains a primary queue 100 to manage one or more write requests between two end points in the DSN. A data structure can be a defined data pipe or conduit between the two end points. In circumstances where items are added to or deleted from the ends of a queue, such as when a first in-first out (FIFO) method is used to organize and manipulate a data buffer, a delegate computing device, such as computing device 12, may become a point of congestion for a queue and thereby limit the queue's output.

In an embodiment, a data structure, such as data structure #1 from FIG. 2 may employ one or more secondary queue(s) 102, and data structure #1 may then scale the one or more secondary queues 102 dynamically. When a delegate computing device, such as computing device 12, responsible for the head or tail of a FIFO queue is a congestion point for data movement between two DSN endpoints data structure #1 may add one or more secondary queues, in order to provide better throughput for data movement between memory devices in DSN memory 22. For example, DAP is used to delegate computing device 12 from FIG. 2 to process a write request for SU#1 36 (to SU#n 36). Computing device 12 employs data structure #1 and primary queue 100 to process the write request between SU#1 36 and SU#n 36. Data structure #1 may be configured with a policy that defines characteristics of the data movement between the endpoints. In an embodiment, the policy is used to define triggers, such as scaling triggers, and one or more load balancing strategies relative to the data structure #1. Secondary queues may be dynamically created and deleted as required according to the data structure and/or a pool of pre-allocated secondary queues may be provided for use in the data structure.

Scaling triggers may include, but are not limited to system storage capacity, delegate resource capacity, the number of items present in a given queue, and the number of items pending to be queued. Scaling triggers may include upper and/to lower watermarks, in order to provide, for example, hysteresis for the scaling function of data structure #1.

Computing devices, such as computing device 12, may be delegated to simultaneously process more than one write request. For example, computing device 12 may include one or more additional data structures, such as data structure #2, where data structure #2 processes data movement between any of the SUs 36 of DSN memory 22. Additionally, computing core 26 from any of computing devices 12 of FIG. 1, queue metrics engine 46 and/or SU 36, along with any the DSN processing elements of FIG. 12 may be delegated to process write requests. Additionally, the DAP may be processed by any of the same DSN processing elements.

Figure 3:
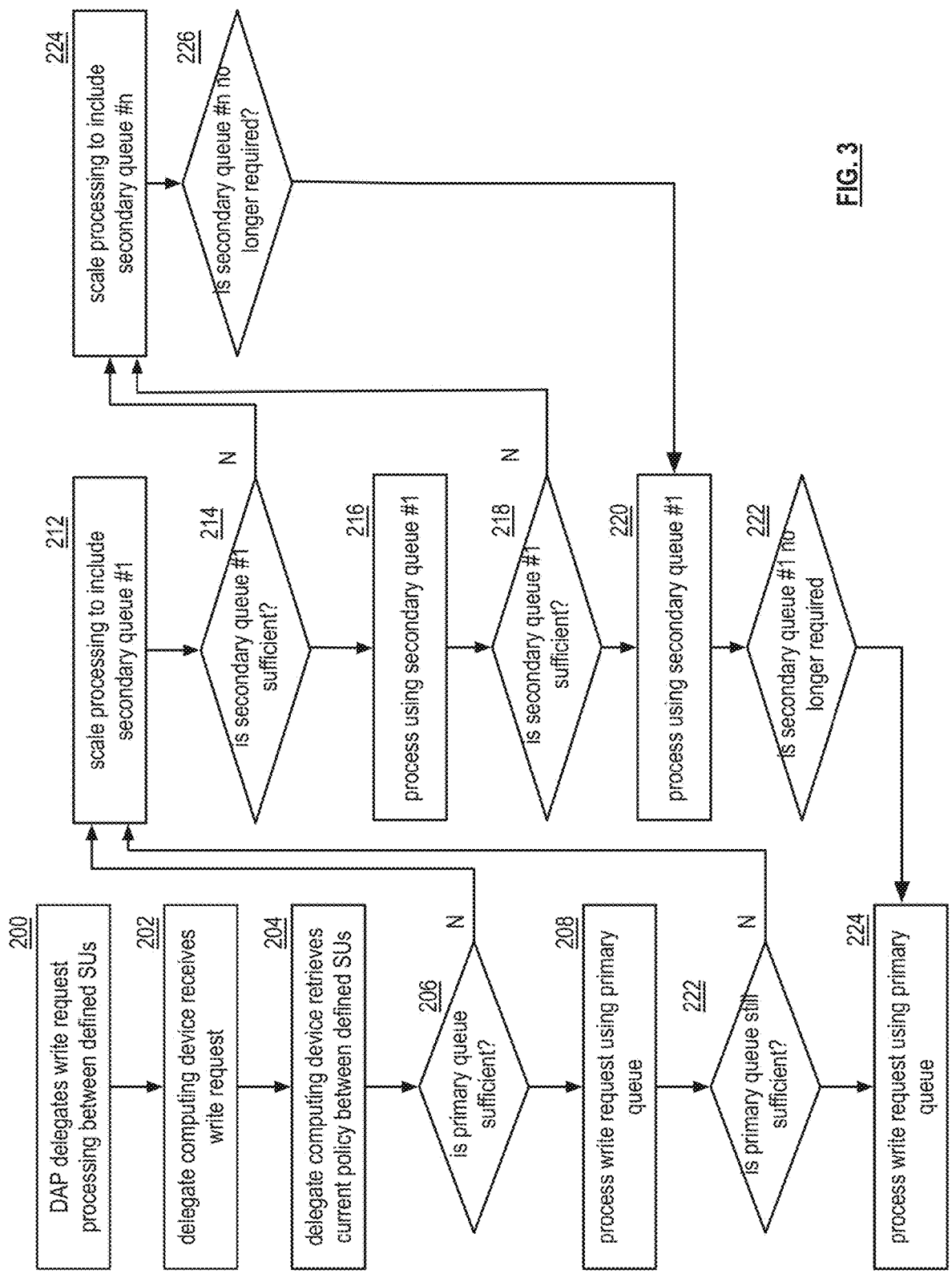
FIG. 3 is a logic diagram of an example method for multi-queue scaling in accordance with the present invention.

FIG. 3 is a logic diagram of an example method of multi-queue processing in accordance with the present invention. In step 200 the DAP delegates the processing for a write request to a computing device. The write request may be pursuant to a rebuilding request, such as described in FIGS. 5-7, or it may be based on a variety of other DSN functions, such as decommissioning or maintenance of the source SU. The delegation of the computing device, such as computing device 12 from FIG. 1, may be based on the DAP, an embodiment of which is described in FIGS. 8-11. In step 202 the delegate computing device receives the write request and retrieves the current policy for the source and target SUs identified by the write request in step 204. The source of the current policy may be (but is not limited to) another computing device in the DSN, including another SU (such as the source or target SU), another computing device 12, the queue metrics engine, and/or any of the computing devices of DSN 10 described in FIGS. 12-19. The delegate computing device may then apply the policy at step 206 to determine whether the primary queue is sufficient to process the write request by, for example comparing metrics for the primary queue to the scaling triggers and/or load balancing strategy defined in the policy.

The method continues at step 212, where the application of the policy indicates that the data structure should be scaled to include a secondary queue. In step 214 delegate computing device determines whether the secondary queue is sufficient according to the policy and when it is not sufficient an additional secondary queue is added until either the existing queues are sufficient, or no other queues are available. In steps 226 and 218 an added secondary queue assessed to determine whether it is still necessary, and when it is not the queue is scaled back to a lower number of queues until, as shown in step 22 no secondary queues are needed and processing is scaled back to processing the write request using just the primary queue, as shown in step 224.

Figure 4:
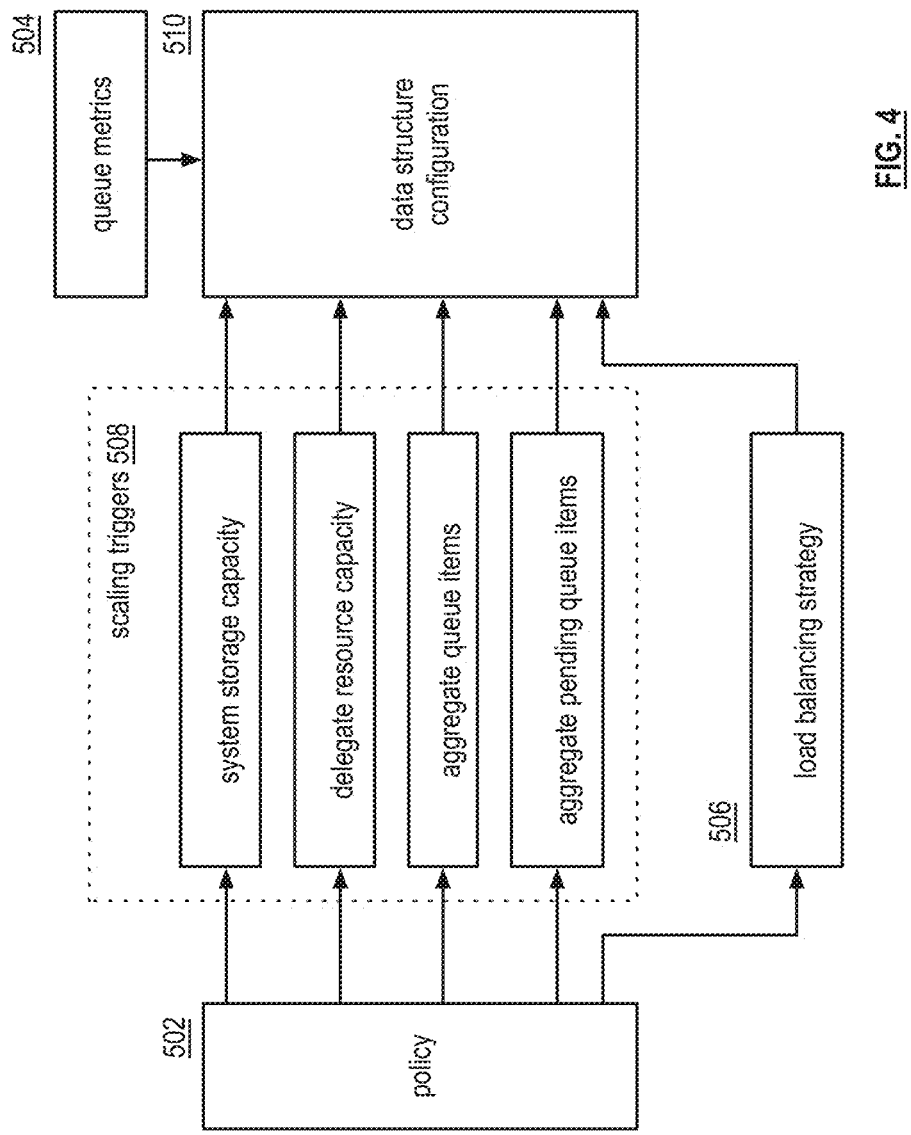
FIG. 4 is a schematic block diagram of a generic example of a multi-queue scaling function in accordance with the present invention.

FIG. 4 is a schematic block diagram of a generic example of a multi-queue processing function in accordance with the present invention. Individual queues of the one or more data structures maintained by the delegated computing devices may include metrics useful to define scaling triggers. Policy 502 includes scaling triggers 508, including system storage capacity, delegate resource capacity, aggregate queue items, aggregate pending queue items, along with additional pipe attributes that may serve to define the characteristics of the pipe. Load balancing strategy 506 may be defined a priori by the DSN, or may be updated to accommodate changes to the DSN, including addition or subtraction of storage devices, modification of storage contents and/or objectives, and changes to the operating conditions of DSN elements. Application of the policy, including scaling triggers 508 and/or load balancing strategy 506, defines the data structure configuration 510, which then may include measured queue metrics to scale the number of queues used to process a given write request (see FIG. 3).

Figure 5:
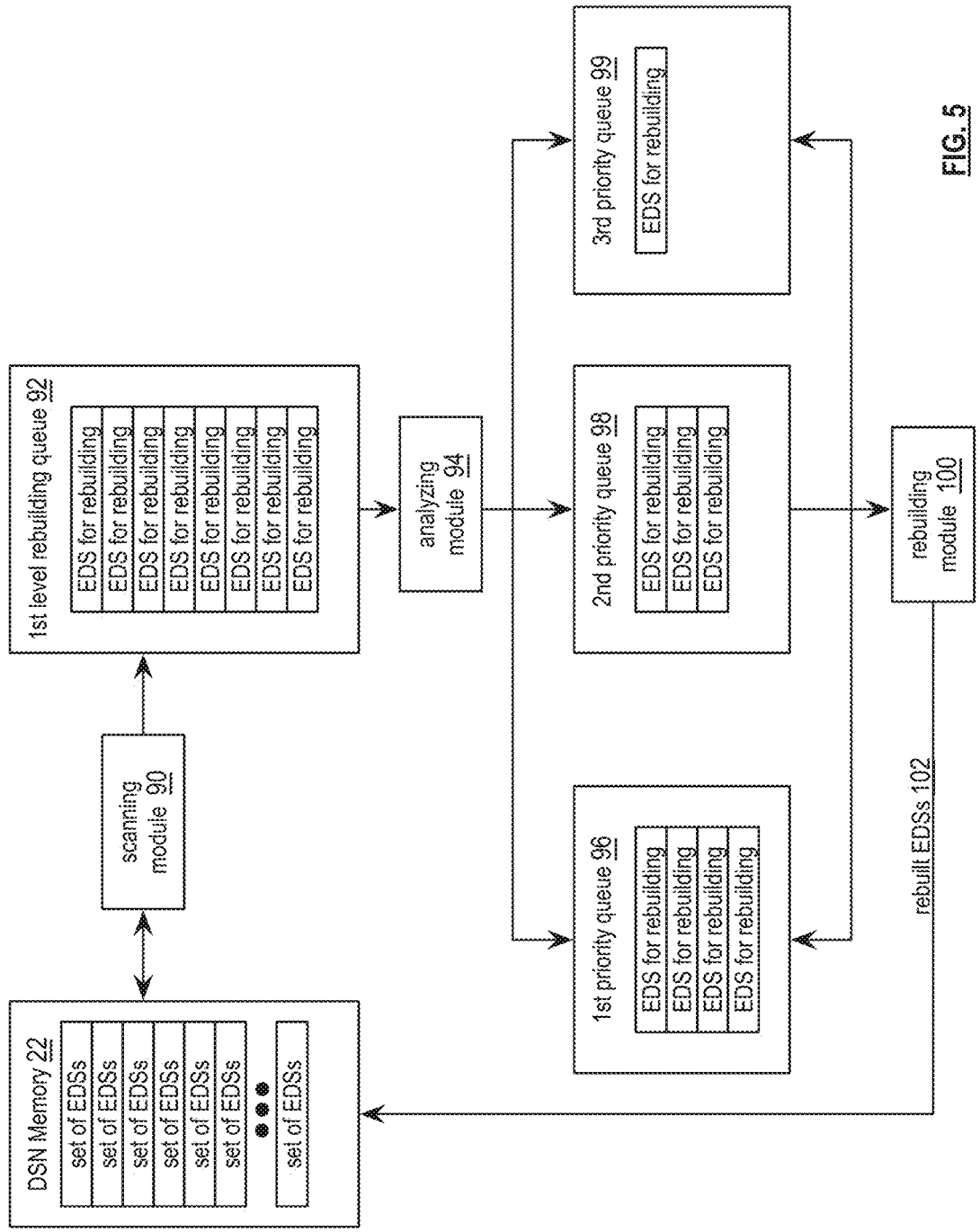
FIG. 5 is a schematic block diagram of a specific example of rebuilding encoded data slices in accordance with the present invention.

FIG. 5 is a schematic block diagram of an embodiment of rebuilding encoded data slices in a dispersed storage network (DSN). The DSN includes a DSN memory 22, a scanning module 90, a $1^{st}$ level rebuilding queue 92, an analyzing module 94, a $1^{st}$ priority queue 96, a $2^{nd}$ priority queue 98, a $3^{rd}$ priority queue 99, and a rebuilding module 100. Note one or more of the scanning module 90, the analyzing module 94 and the rebuilding module 100 may be implemented within a computing device or within multiple computing devices. As one example, a first computing device includes the scanning module 90, a second computing device includes the analyzing module 94, and a third computing device includes the rebuilding module 90. As another example, a first computing device includes the scanning module 90, the analyzing module 94 and the rebuilding module 100. As yet another example, a first computing device includes the scanning module 90, and a second computing device includes the analyzing module 94 and the rebuilding module 100.

In an example of operation, the scanning module 90 scans a plurality of sets of encoded data slices that are stored in DSN memory 22 to identify encoded data slices that need rebuilding (e.g., missing, outdated version, flagged, etc.). For example, the scanning module sends list requests to storage units of the DSN that include a request to list slice names of encoded data slices being stored by the respective storage units. The scanning module 90 then receives list responses from the storage units that include a list of slices names of encoded data slices that are stored by the respective storage units. The scanning module then interprets the list of slices names of encoded data slices that are stored by the respective storage units to identify the encoded data slices that need rebuilding.

Continuing with the example of operation, when the scanning module 90 identifies encoded data slices for rebuilding, the scanning module 90 adds the identified encoded data slices to the $1^{st}$ level rebuilding queue 92. As an example, the scanning module 90 scans a first set of encoded data slices and determines that a fifth encoded data slice of the first set is corrupted (e.g., a computed slice name does not match a stored slice name) and an eighth encoded data slice of the first set is missing (e.g., the storage unit did not respond with a slice name for the eighth encoded data slice). The scanning module 90 then adds the fifth and eighth encoded data slices to the $1^{st}$ level rebuilding queue 92.

As encoded data slices for rebuilding are added to the $1^{st}$ level rebuilding queue 92, the analyzing module 94 analyzes the encoded data slices of the $1^{st}$ level rebuilding queue 92 based on a rebuilding prioritization function to establish a priority level for at least some of the identified encoded data slices. For example, during a first timeframe, the $1^{st}$ level rebuilding includes eight encoded data slices for rebuilding. The analyzing module analyzes the eight encoded data slices for rebuilding based on the rebuilding prioritization function and determines that a first group of four encoded data slices are of a first priority, that a second group of three encoded data slices are of a second priority, and a third group of one encoded data slice is of a third priority. Having determined the priorities, the analyzing module transfers the first group to the first priority queue 96, the second group to the second priority queue 98 and the third group to the third priority queue 99.

After transferring at least one group of encoded data slices to one of the priority queues, the rebuilding module 100 rebuilds encoded data slices of the at least one group in accordance with a rebuilding prioritization protocol. Note the rebuilding prioritization protocol comprises one of rebuilding the first group of encoded data slices before rebuilding the second group of encoded data slices, rebuilding the first and second group of encoded data slices in an imbalanced round robin manner that favors rebuilding the first group of encoded data slices, and rebuilding the first and second group of encoded data slices in accordance with an anti-starvation protocol.

For example, the rebuilding module 100 may rebuild all encoded data slices in the first priority queue 96 before rebuilding any encoded data slices in the second priority queue 96. As another example, the rebuilding module 100 may rebuild in a round robin fashion such that for every four encoded data slices that are rebuilt in the first priority queue 96, two encoded data slices are rebuilt in the second priority queue 98, and one encoded data slice is rebuilt in the third priority queue 99. As yet another example, the rebuilding module 100 may spend 80% of time rebuilding encoded data slices of the $1^{st}$ priority queue 96, 15% of time rebuilding encoded data slices of the $2^{nd}$ priority queue 98 and 5% of time rebuilding encoded data slices of the 3rd priority queue 99. After rebuilding the encoded data slices for rebuilding, the rebuilding module 100 sends the rebuilt encoded data slices 102 to DSN memory 22 for storage.

Referring to FIG. 1, the queue metrics engine (QME) 46 may track attributes, such as tasks, performance and reliability of individual queues associated with one or more computing cores 26, as well as the aggregate attributes of a plurality of queues associated with the computing cores 26. Applications for the QME include using the QME to provide metrics that can be used in conjunction with one or more load balancing strategies to assist a determination that a given queue that has been designated to process a write request. For example, if metrics indicate that queue insertion is contributing to a bottleneck in data movement, a data structure executing in an associated computing core 26 may add one or more secondary queues. In another example, when a computing core 26 adds one or more secondary queues to accommodate a queue load insertion task, a round robin scheme may be used, where load for processing the write request is assigned to the one or more secondary queues in equal portion and in circular order, without a priority relationship between the one or more secondary queues. In yet another example, when a computing core 26 adds one or more secondary queues to accommodate a queue load removal task, filling up the target queue as quickly as possible may be preferable so that the load removal task can be evenly distributed between the one or more queues. In these examples, a majority of load insert tasks may be appropriately assigned to a recently added queue, while load removal tasks may be distributed using the round robin scheme.

QME may be used to provide to system analysis for applications running on the DSN, and/or for service users accessing the DSN. For example, the QME can be used to determine efficiency of tasks as they are executing in queues distributed across processing devices, as well as to determine how well the operations are being scaled with multiple queues, and the aggregate status of task assigned to one or more designate computing cores 26.

QME 46 may also be used to provide useful information to one or more DSN users associated with a write request, or a data object, data segments, and/or encoded data slices associated with the one or more DSN users. QME 46 applications may also include providing useful information to a management framework (such as a deployment management framework) associated with the DSN. For example, metrics provided by the QME may be used to identify bottlenecks in the DSN, identify underperforming hardware or software elements, and to identify potential opportunities to optimize one or more elements of the DSN; which can be used in turn to scale workload on the DSN.

Collectively, data structures, as described herein enable the DSN to provide a scalable distributed framework that may be self-balancing for use in data movement between DSN elements. The QME is provides an additional attribute of providing useful monitoring for interested entities of the DSN.

Figure 6:
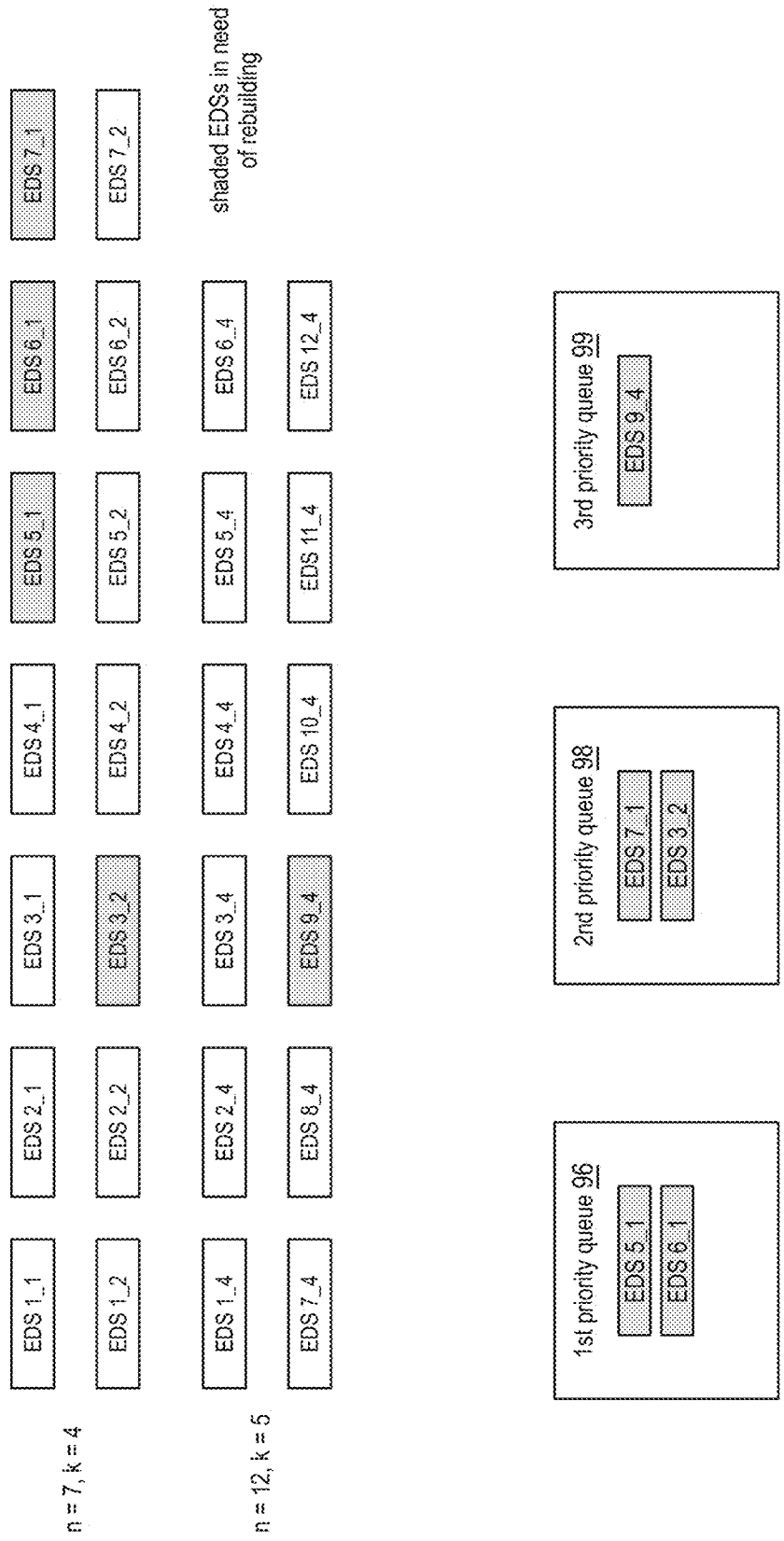
FIG. 6 is a schematic block diagram of an example of determining prioritization of encoded data slices in accordance with the present invention.

FIG. 6 is a schematic block diagram of an example of determining prioritization of encoded data slices. The encoded data slices and add to priority queues in accordance with the prioritization. The priority queues include $1^{st}$ priority queue 96, $2^{nd}$ priority queue 98, and $3^{rd}$ priority queue 99. Note that although three priority queues are illustrated, there may be less or more priority queues in other embodiments.

As illustrated, a first and a second set of encoded data slices are associated with a first data object with dispersed storage error encoded parameters that include a pillar width (e.g., n) of 7 and a decode threshold (e.g., k) of 4, and a third set of encoded data slices is associated with a second data object with dispersed storage error encoded parameters that include a pillar width of 12 and a decode threshold of 5.

The shaded encoded data slices are encoded data slices that are in need of rebuilding (e.g., corrupted, outdated, flagged, etc.). For example, in the first set of encoded data slices of the first data object (e.g., EDS 1_1 through EDS 7_1), encoded data slices EDS 5_1, EDS 6_1, and EDS 7_1 need rebuilding, in the second set of encoded data slices of the first data object (e.g., EDS 1_2 through EDS 7_2), encoded data slice EDS 3_2 need rebuilding, and in the third set of encoded data slices of the second data object (e.g., EDS 1_4 through EDS 12_4), encoded data slice EDS 9_4 needs rebuilding. The analyzing module 94 module analyzes the encoded data slices that need rebuilding based on a rebuilding prioritization function to establish a prioritization for at least some of the identified encoded data slices (e.g., EDS 5_1, EDS 6_1, EDS 7_1, EDS 3_2 and EDS 9_4).

In this example, the analyzing module determines EDS 5_1 and EDS 6_1 are a first priority, EDS 7_1 and EDS 3_2 are a second priority, and EDS 9_4 is a third priority. The rebuilding prioritization function that establishes the priorities may be based on a loss of data risk analysis function that is executed on a set of encoded data slices by set of encoded data slices basis. The loss of data risk may be determined by one or more of a pillar number, a decode threshold number, a number of encoded data slices in a set of encoded data slices that need rebuilding, and a storage unit reliability.

For example, the first set of encoded data slices (EDS 1_1-EDS 7_1) has a pillar width of 7, a decode threshold of 4 and 3 encoded data slices that need rebuilding. Thus, as the first set of encoded data slices can tolerate loss of another encoded data slice, at least one of the encoded data slices (e.g., EDS 5_1, EDS 6_1, EDS 7_1) should be given the highest priority. Note that within the highest priority, one or more of the encoded data slices may have a higher priority. For example, initially EDS 5_1, EDS 6_1 and EDS 7_1 would all be included in the first priority, however, once EDS 5_1 has been rebuilt, EDS 6_1 will have a lower loss of data risk as the first set may now tolerate failure of one encoded data slice. Further, once EDS 5_1 and 6_1 are both rebuilt, the loss of data risk will be lower as the first set of encoded data slices may now tolerate two failures and still be recoverable. Thus, EDS 7_1 may instead be determined to have a second priority, which is lower than the first priority. In this example EDS 7_1 and EDS 3_2 are of the second priority, however the priority for EDS 7_1 may be higher than EDS 3_2, even though the slice risk value (e.g., difference between the redundancy value (e.g., a difference between the pillar number and the decode threshold number) and the number of encoded data slices in the set of encoded data slices that are in need of rebuilding) are substantially similar. In one example, this may be due to a storage unit reliability level of a storage unit storing an encoded data slice of the second set of encoded data slice being higher that a storage unit reliability level of a storage unit storing an encoded data slice of the first set of encoded data slices. Thus, the first set of encoded data slices has a higher loss of data risk than the second set of encoded data slices.

The third set of encoded data slices includes a pillar width of 12, a decode threshold of 5 and 1 encoded data slice that needs rebuilding. Thus, at this time, the third set could tolerate failure of up to six encoded data slices and still be recoverable. As such, EDS 9_4 may be determined to have a low rebuilding priority (e.g., a third priority) and thus may be transferred to the 3$^{rd}$ priority queue 99.

Figure 7:
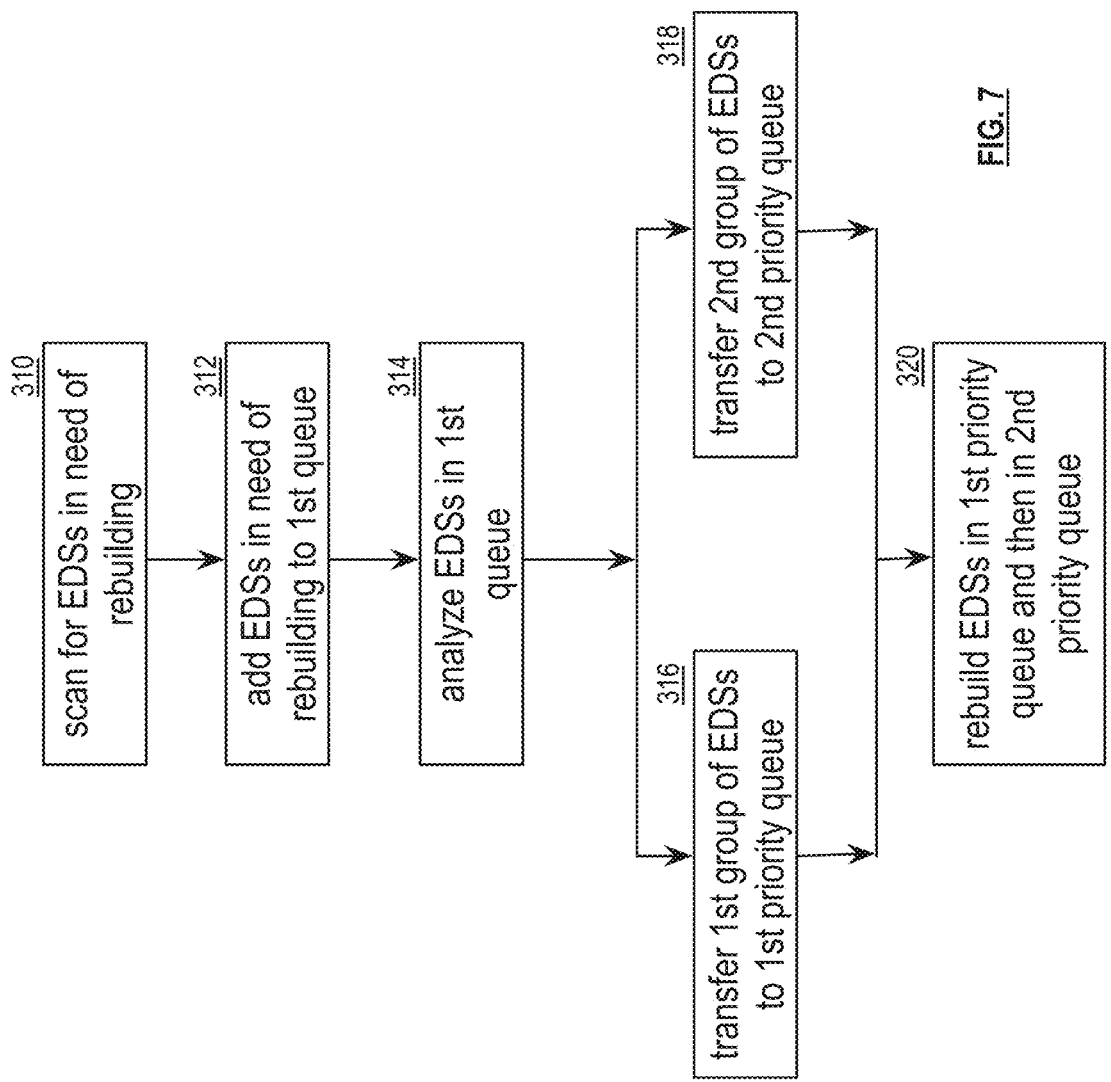
FIG. 7 is a schematic block diagram of an example of a method of rebuilding encoded data slices in accordance with the present invention.

FIG. 7 is a flowchart illustrating an example of a method of rebuilding encoded data slices. The method begins with step 110, where a scanning module of a computing device scans, from one or more plurality of sets of encoded data slices to other one or more plurality of sets of encoded data slices, to identify encoded data slices that need rebuilding. As an example of the scanning, the scanning module sends list requests to storage units of the DSN, that include a request to list slice names of encoded data slices being stored by the respective storage units. Next, the scanning module receives list responses from the storage units that include a list of slices names of encoded data slices that are stored by the respective storage units. The scanning module then interprets the list of slices names of encoded data slices that are stored by the respective storage units to identify the encoded data slices that need rebuilding.

The method continues with step 112, where the scanning module adds the identified encoded data slices into a first level rebuilding queue. The method continues with step 114, where an analyzing module of a computing device analyzes identified encoded data slices in the first level rebuilding queue based on a rebuilding prioritization function to establish a prioritization for at least some of the identified encoded data slices in the first level rebuilding queue. Note the prioritization function includes a loss of data risk analysis function that is executed on a set of encoded data slices by set of encoded data slices basis.

For example, for a set of encoded data slices of the one or more plurality of sets of encoded data slices or of the other one or more plurality of sets of encoded data slices, the analyzing module determines a pillar number, a decode threshold number, a number of encoded data slices in the set of encoded data slices that are in need of rebuilding and determines a redundancy value based on a difference between the pillar number and the decode threshold number. Next, the analyzing module determines a slice risk value based on a difference between the redundancy value and the number of encoded data slices in the set of encoded data slices that are in need of rebuilding and determines storage unit reliability of a set of storage units of the DSN that is storing the set of encoded data slices. Having determined the slice risk value and the storage unit reliability, the analyzing module generates a loss of data risk indication based on the slice risk value and the storage unit reliability. When the loss of data risk indication is above a threshold, the analyzing module places one or more encoded data slices of the set of encoded data slices that need rebuilding in the first group of encoded data slices.

When the at least some of the identified encoded data slices in the first level rebuilding queue are of a first priority, the method continues with step 116, where the analyzing module transfers a first group of encoded data slices in the first level rebuilding queue into a first priority rebuilding queue based on the analyzing.

When the at least some of the identified encoded data slices in the first level rebuilding queue are of a second priority, the method continues with step 118, where the analyzing module transfers a second group of encoded data slices in the first level rebuilding queue into a second priority rebuilding queue based on the analyzing. Note the first rebuilding priority queue has priority over the second priority rebuilding queue.

The method continues with step 120, where a rebuilding module of a computing device rebuilds the first and second group of encoded data slices based on a rebuilding prioritization protocol. As an example of the rebuilding, the rebuilding module may determine whether the time to rebuild the first group of encoded data slices will exceed a priority rebuild time threshold. When the time to rebuild the first group of encoded data slices will exceed the priority rebuild time threshold, the rebuilding module allocates a sub-group of the first group of encoded data slices to a second rebuilding module for rebuilding. Note the second rebuilding module may be operable on the first computing device, the second computing device, the third computing device, or a fourth computing device of the one or more computing devices. Further note, the rebuilding prioritization protocol includes one of rebuilding the first group of encoded data slices before rebuilding the second group of encoded data slices, rebuilding the first and second group of encoded data slices in an imbalanced round robin manner that favors rebuilding the first group of encoded data slices, and rebuilding the first and second group of encoded data slices in accordance with an anti-starvation protocol.

In one instance, when an encoded data slice has been in a lower priority group (e.g., the second group, the third group, etc.) of encoded data slices for a predetermined period of time, the encoded data slice may be re-analyzed based on the rebuilding prioritization function to determine whether the encoded data slice should be moved to a higher priority group (e.g., the first group) of encoded data slices. When it is determined to move the encoded data slice to the first group of encoded data slices, a computing device (e.g., the analyzing module 94, the rebuilding module 100) transfers the encoded data slice to the first group of encoded data slices.

Figure 8:
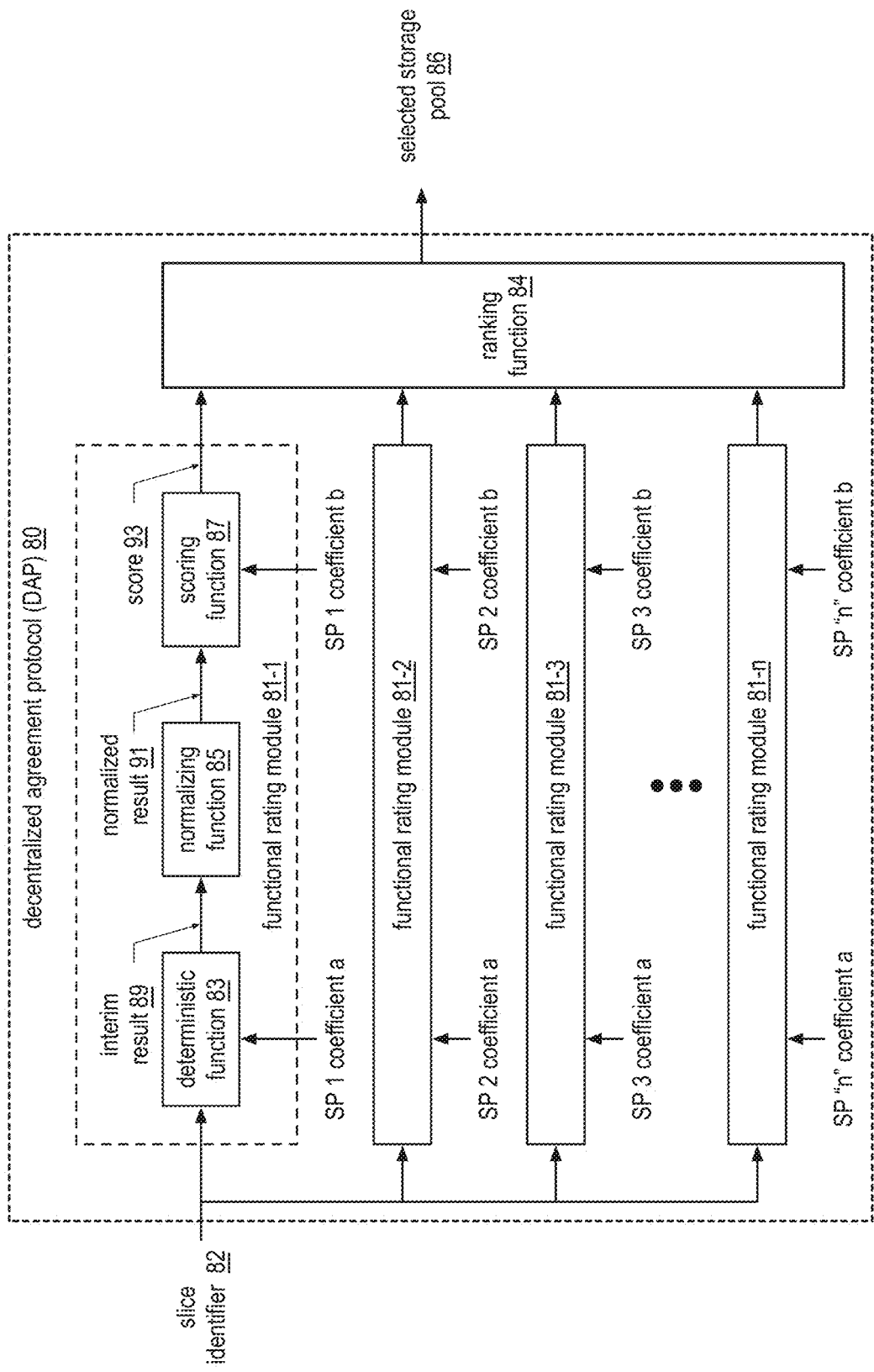
FIG. 8 is a schematic block diagram of an embodiment of a decentralized, or distributed, agreement protocol in accordance with the present invention

FIG. 8 is a schematic block diagram of an embodiment of a decentralized, or distributed, agreement protocol (DAP) 80 that may be implemented by a computing device, a storage unit, and/or any other device or unit of the DSN to determine where to store encoded data slices or where to find stored encoded data slices. The DAP 80 includes a plurality of functional rating modules 81. Each of the functional rating modules 81 includes a deterministic function 83, a normalizing function 85, and a scoring function 87.

Each functional rating module 81 receives, as inputs, a slice identifier 82 and storage pool (SP) coefficients (e.g., a first functional rating module 81-1 receives SP 1 coefficients "a" and b). Based on the inputs, where the SP coefficients are different for each functional rating module 81, each functional rating module 81 generates a unique score 93 (e.g., an alpha-numerical value, a numerical value, etc.). The ranking function 84 receives the unique scores 93 and orders them based on an ordering function (e.g., highest to lowest, lowest to highest, alphabetical, etc.) and then selects one as a selected storage pool 86. Note that a storage pool includes one or more sets of storage units 86. Further note that the slice identifier 82 corresponds to a slice name or common attributes of set of slices names. For example, for a set of encoded data slices, the slice identifier 120 specifies a data segment number, a vault ID, and a data object ID, but leaves open ended, the pillar number. As another example, the slice identifier 82 specifies a range of slice names (e.g., 0000 0000 to FFFF FFFF).

As a specific example, the first first functional module 81-1 receives the slice identifier 82 and SP coefficients for storage pool 1 of the DSN. The SP coefficients includes a first coefficient (e.g., "a") and a second coefficient (e.g., "b"). For example, the first coefficient is a unique identifier for the corresponding storage pool (e.g., SP #1's ID for SP 1 coefficient "a") and the second coefficient is a weighting factor for the storage pool. The weighting factors are derived to ensure, over time, data is stored in the storage pools in a fair and distributed manner based on the capabilities of the storage units within the storage pools.

For example, the weighting factor includes an arbitrary bias which adjusts a proportion of selections to an associated location such that a probability that a source name will be mapped to that location is equal to the location weight divided by a sum of all location weights for all locations of comparison (e.g., locations correspond to storage units). As a specific example, each storage pool is associated with a location weight factor based on storage capacity such that, storage pools with more storage capacity have a higher location weighting factor than storage pools with less storage capacity.

The deterministic function 83, which may be a hashing function, a hash-based message authentication code function, a mask generating function, a cyclic redundancy code function, hashing module of a number of locations, consistent hashing, rendezvous hashing, and/or a sponge function, performs a deterministic function on a combination and/or concatenation (e.g., add, append, interleave) of the slice identifier 82 and the first SP coefficient (e.g., SU 1 coefficient "a") to produce an interim result 89.

The normalizing function 85 normalizes the interim result 89 to produce a normalized interim result 91. For instance, the normalizing function 85 divides the interim result 89 by a number of possible output permutations of the deterministic function 83 to produce the normalized interim result. For example, if the interim result is 4,325 (decimal) and the number of possible output permutations is 10,000, then the normalized result is 0.4325.

The scoring function 87 performs a mathematical function on the normalized result 91 to produce the score 93. The mathematical function may be division, multiplication, addition, subtraction, a combination thereof, and/or any mathematical operation. For example, the scoring function divides the second SP coefficient (e.g., SP 1 coefficient "b") by the negative log of the normalized result (e.g., $e^y=x$ and/or $\ln(x)=y$). For example, if the second SP coefficient is 17.5 and the negative log of the normalized result is 1.5411 (e.g., e(0.4235)), the score is 11.3555.

The ranking function 84 receives the scores 93 from each of the function rating modules 81 and orders them to produce a ranking of the storage pools. For example, if the ordering is highest to lowest and there are five storage units in the DSN, the ranking function evaluates the scores for five storage units to place them in a ranked order. From the ranking, the ranking module 84 selects one the storage pools 86, which is the target for a set of encoded data slices.

The DAP 80 may further be used to identify a set of storage units, an individual storage unit, and/or a memory device within the storage unit. To achieve different output results, the coefficients are changed according to the desired location information. The DAP 80 may also output the ranked ordering of the scores.

Figure 9:
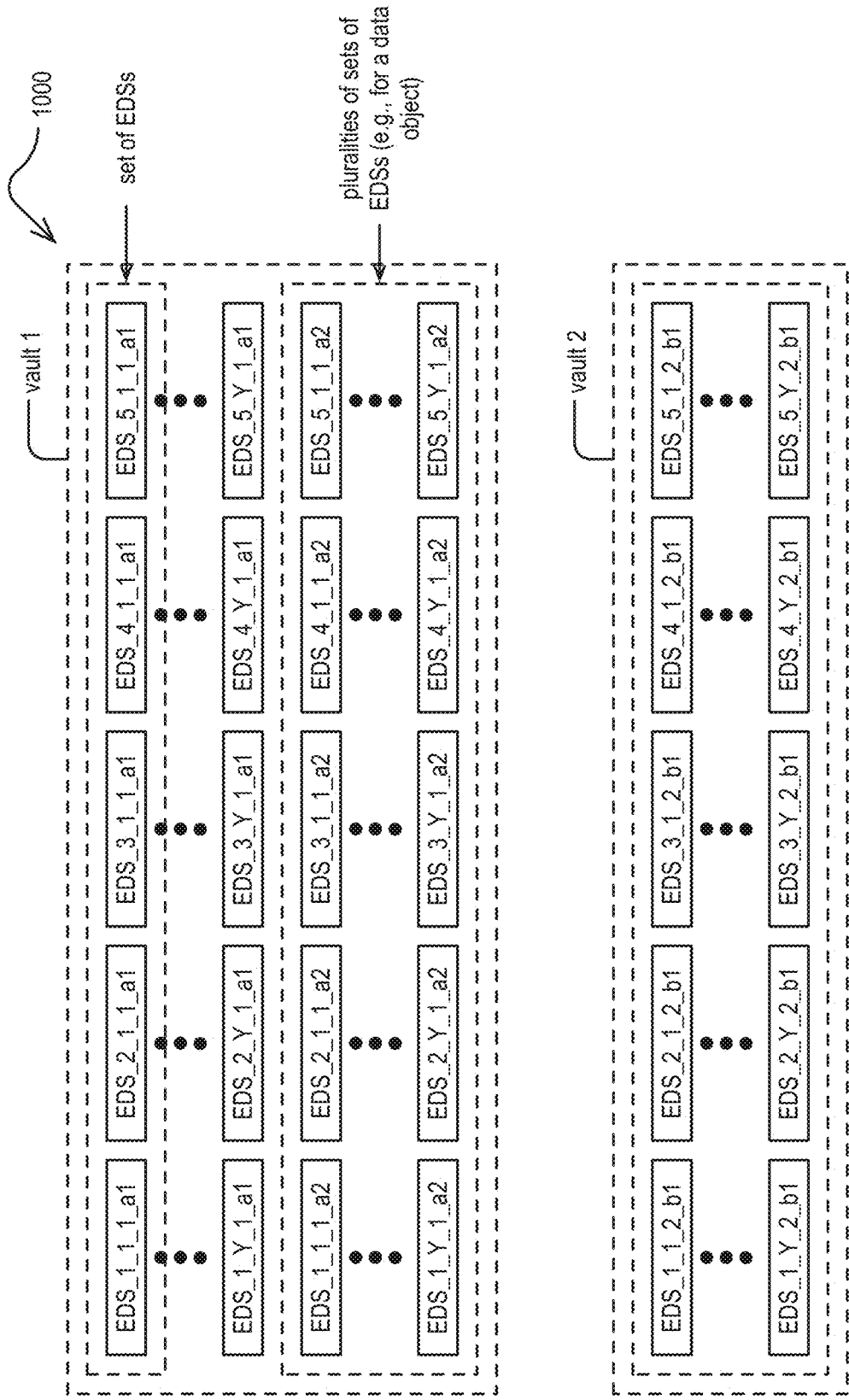
FIG. 9 is a schematic block diagram of an embodiment of creating pluralities of sets of slices in accordance with the present invention.

FIG. 9 is a schematic block diagram 1000 of an example of creating pluralities of sets of slices. Each plurality of sets of encoded data slices (EDSs) corresponds to the encoding of a data object, a portion of a data object, or multiple data object, where a data object is one or more of a file, text, data, digital information, etc. For example, the highlighted plurality of encoded data slices corresponds to a data object having a data identifier of "a2".

Each encoded data slices of each set of encoded data slices is uniquely identified by its slice name, which is also used as at least part of the DSN address for storing the encoded data slice. As shown, a set of EDSs includes EDS 1_1_1_a1 through EDS 5_1_1_a1. The EDS number includes pillar number, data segment number, vault ID, and data object ID. Thus, for EDS 1_1_1_a1, it is the first EDS of a first data segment of data object "a1" and is to be stored, or is stored, in vault 1. Note that vaults are a logical memory container supported by the storage units of the DSN. A vault may be allocated to one or more user computing devices.

As is further shown, another plurality of sets of encoded data slices are stored in vault 2 for data object "b1". There are Y sets of EDSs, where Y corresponds to the number of data segments created by segmenting the data object. The last set of EDSs of data object "b1" includes EDS 1_Y_2_b1 through EDS 5_Y_2_b1. Thus, for EDS 1_Y_2_b1, it is the first EDS of the last data segment "Y" of data object "1" and is to be stored, or is stored, in vault 2.

Figure 10:
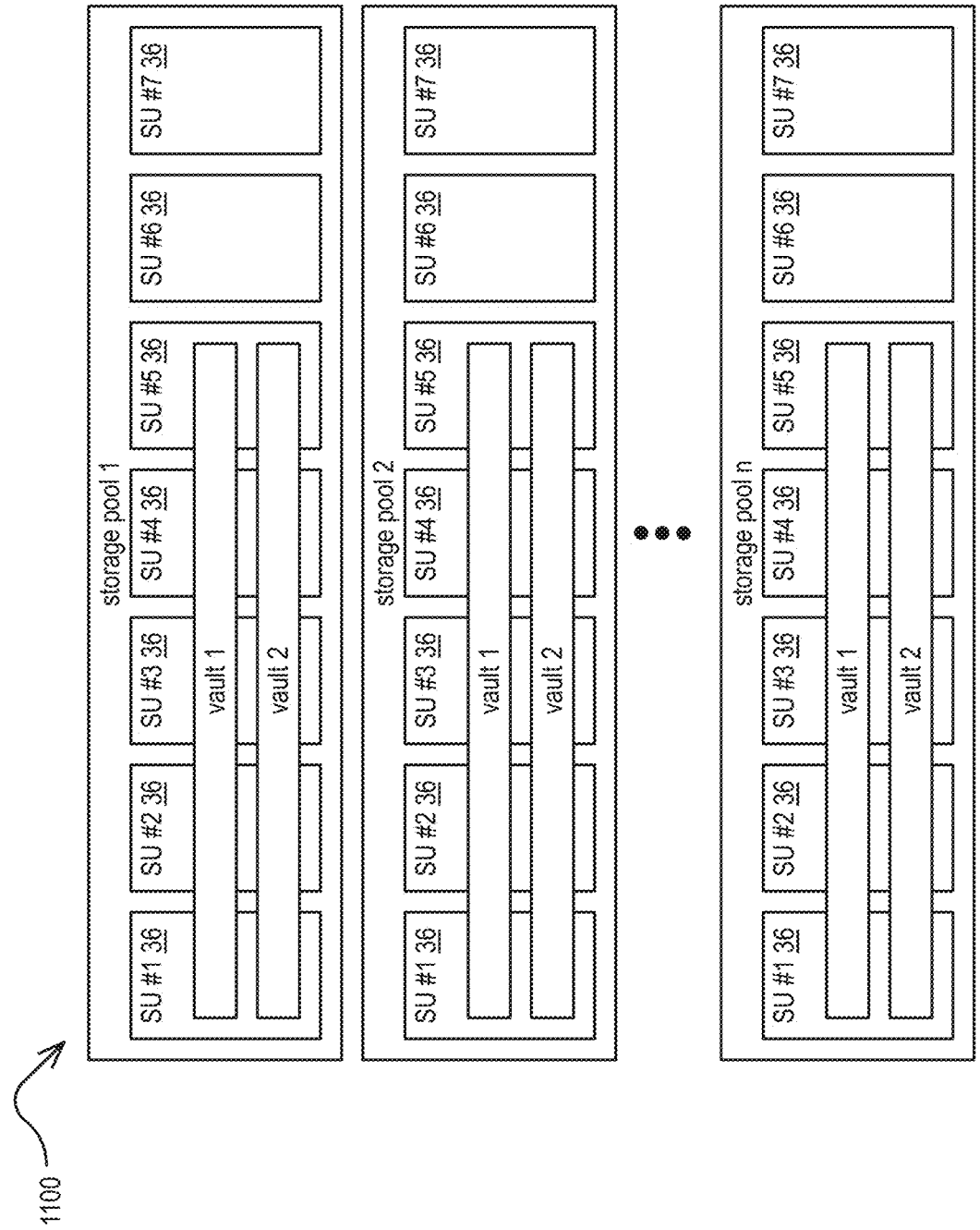
FIG. 10 is a schematic block diagram of an example of storage vaults spanning multiple storage pools in accordance with the present invention.

FIG. 10 is a schematic block diagram 1100 of an example of storage vaults spanning multiple storage pools. In this example, the DSN memory 22 includes a plurality of storage units 36 arranged into a plurality of storage pools (e.g., 1-n). In this example, each storage pool includes seven storage units for ease of illustration. A storage pool, however, can have many more storage units than seven and, from storage pool to storage pool, may have different numbers of storage units.

The storage pools 1-n support two vaults (vault 1 and vault 2) using only five of seven of the storage units. The number of storage units within a vault correspond to the pillar width number, which is five in this example. Note that a storage pool may have rows of storage units, where SU #1 represents a plurality of storage units, each corresponding to a first pillar number; SU #2 represents a second plurality of storage units, each corresponding to a second pillar number; and so on. Note that other vaults may use more or less than a width of five storage units.

Figure 11:
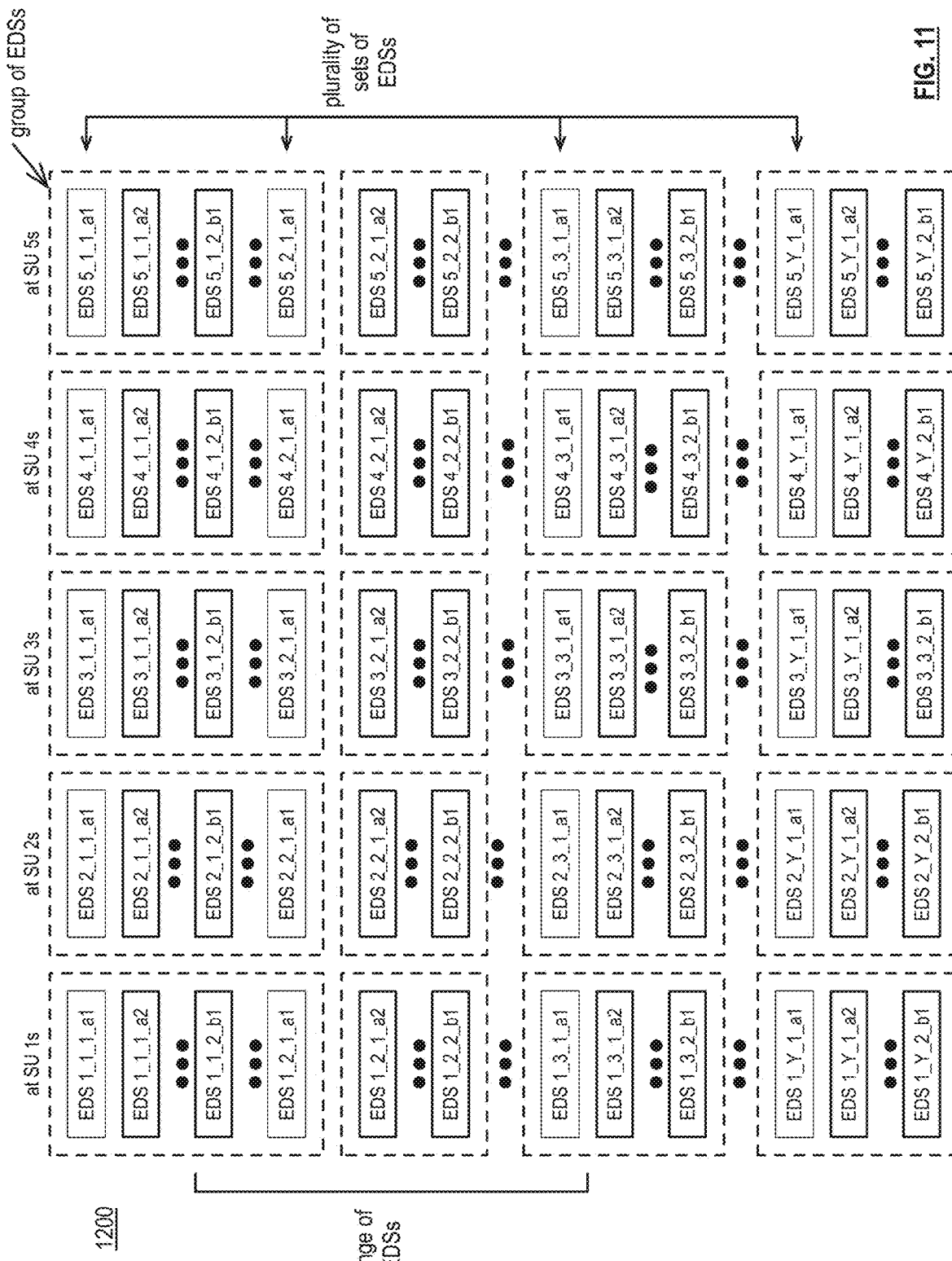
FIG. 11 is a schematic block diagram of an example of storing pluralities of sets of slices in accordance with a distributed agreement protocol.
Figure 21:
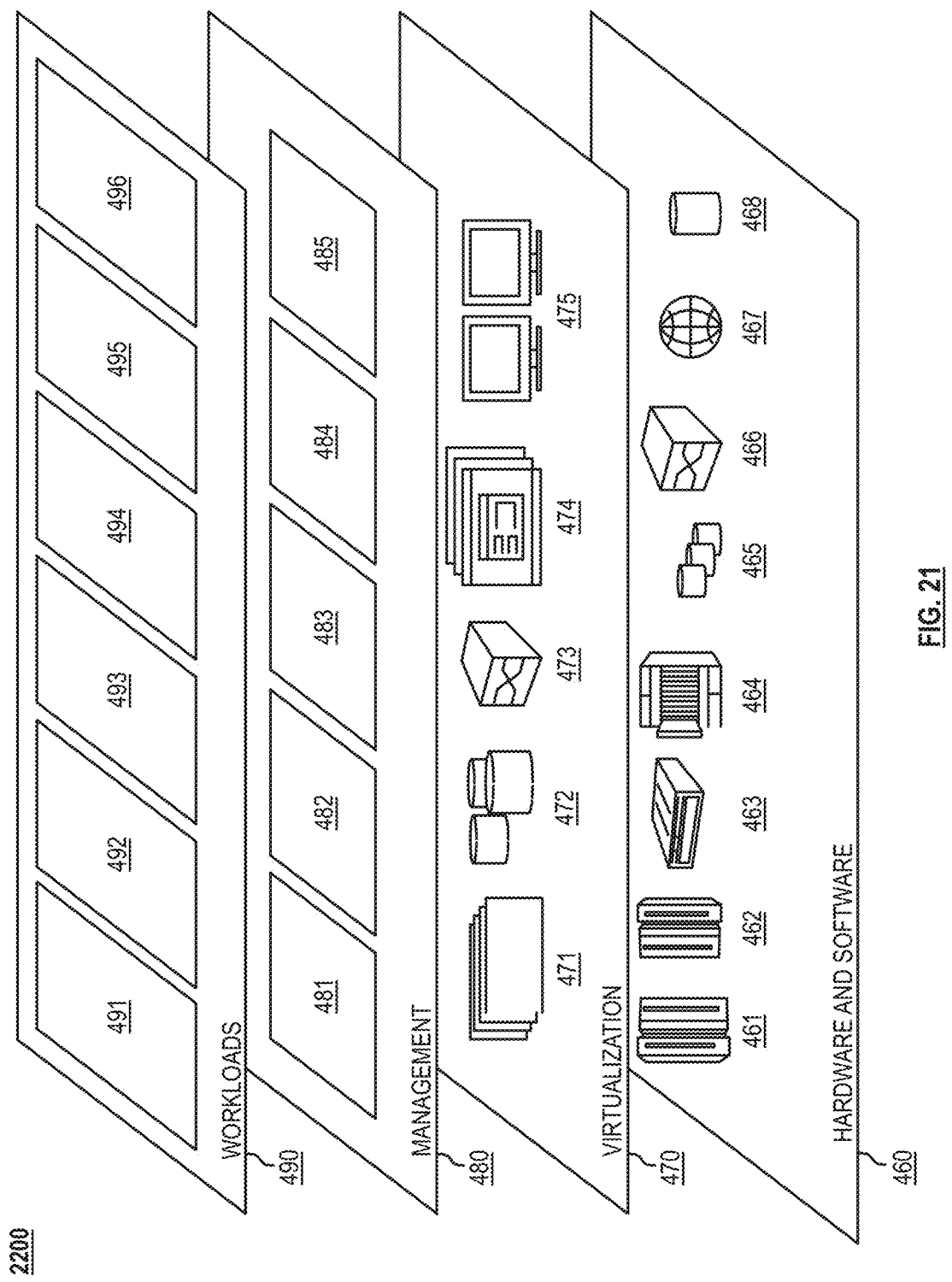
FIG. 21 depicts abstraction model layers according to various embodiments of the present invention.

FIG. 11 is a schematic block diagram 1200 of an example of storing pluralities of sets of slices in accordance with the Decentralized, or Distributed, Agreement Protocol (DAP) 80 of FIG. 21. The DAP 80 uses slice identifiers (e.g., the slice name or common elements thereof (e.g., the pillar number, the data segment number, the vault ID, and/or the data object ID)) to identify, for one or more sets of encoded data slices, a set, or pool, of storage units. With respect to the three pluralities of sets of encoded data slices (EDSs) of FIG. 9, the DAP 80 approximately equally distributes the sets of encoded data slices throughout the DSN memory (e.g., among the various storage units).

The first column corresponds to storage units having a designation of SU #1 in their respective storage pool or set of storage units and stores encoded data slices having a pillar number of 1. The second column corresponds to storage units having a designation of SU #2 in their respective storage pool or set of storage units and stores encoded data slices having a pillar number of 2, and so on. Each column of EDSs is divided into one or more groups of EDSs. The delineation of a group of EDSs may correspond to a storage unit, to one or more memory devices within a storage unit, or multiple storage units. Note that the grouping of EDSs allows for bulk addressing, which reduces network traffic.

A range of encoded data slices (EDSs) spans a portion of a group, spans a group, or spans multiple groups. The range may be numerical range of slice names regarding the EDSs, one or more source names (e.g., common aspect shared by multiple slice names), a sequence of slice names, or other slice selection criteria.

Figure 12:
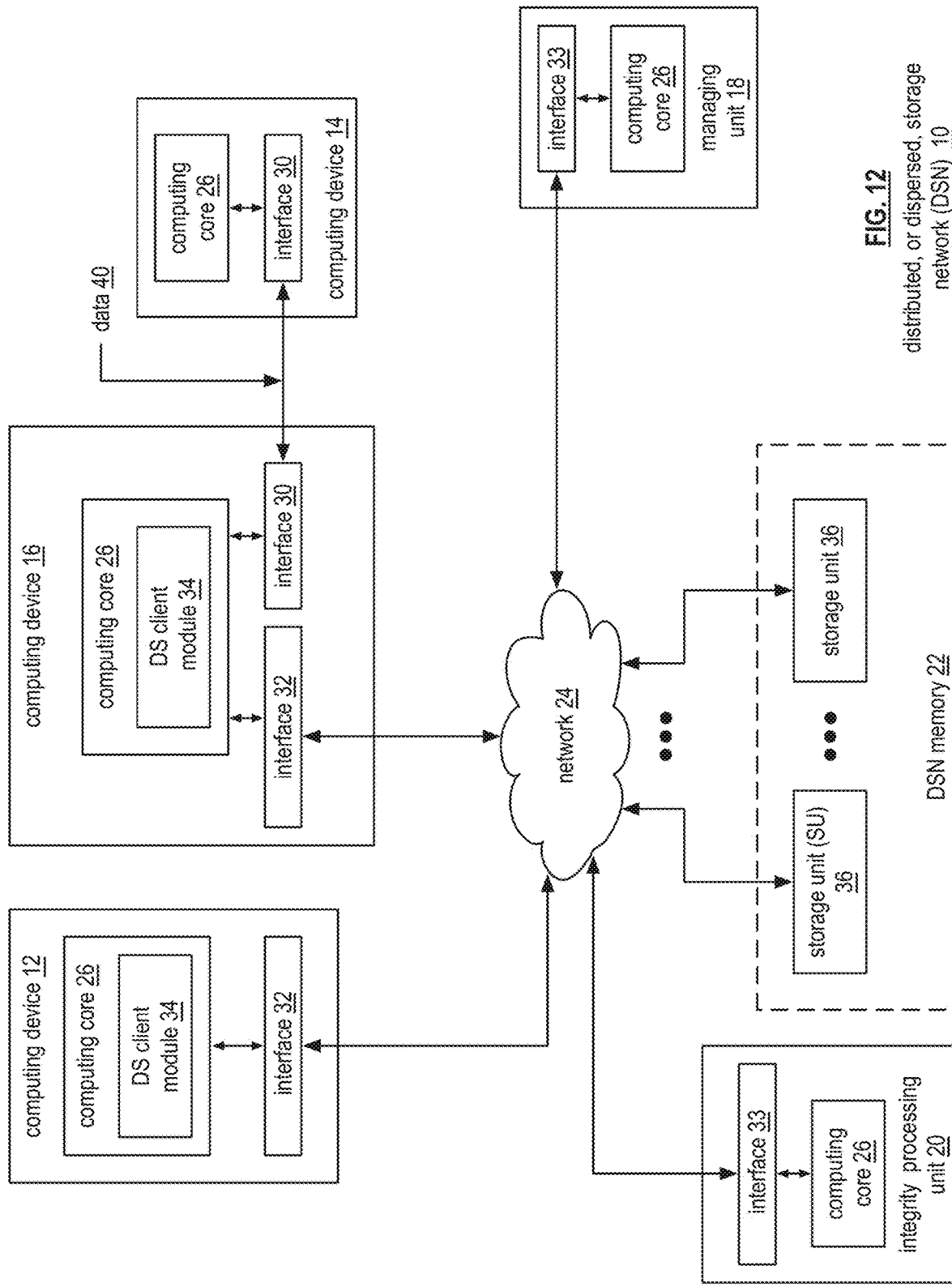
FIG. 12 is a schematic block diagram of an embodiment of a dispersed or distributed storage network (DSN) in accordance with the present invention.

FIG. 12 is a schematic block diagram of an embodiment of a dispersed, or distributed, storage network (DSN) 10 that includes a plurality of computing devices 12-16, a managing unit 18, an integrity processing unit 20, and a DSN memory 22. Note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include the computing core 26, which includes network interfaces 30-33. Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

Figure 13:
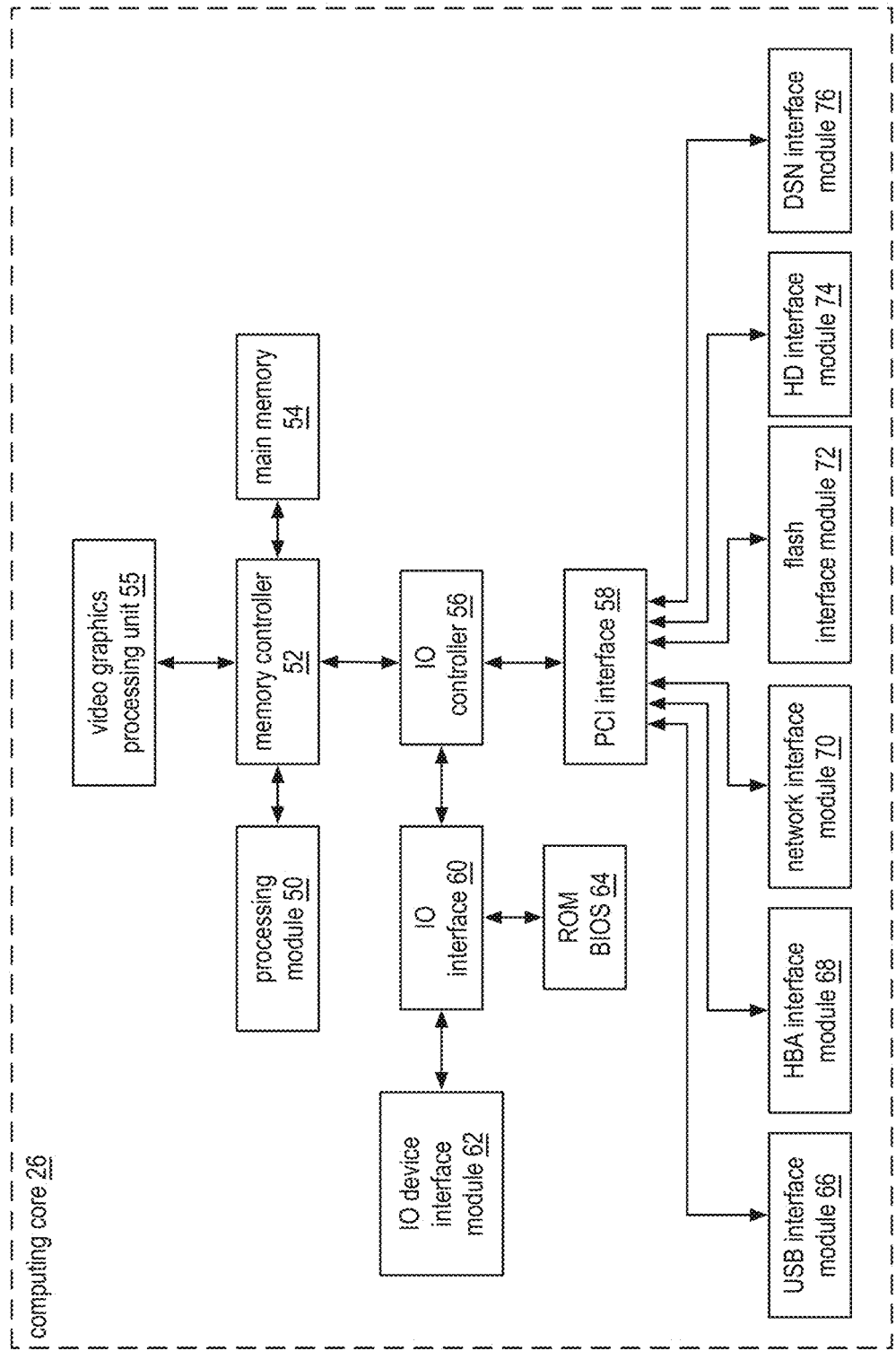
FIG. 13 is a schematic block diagram of an embodiment of a computing core in accordance with the present invention.

FIG. 13 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 14 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 15 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 16 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 14, the computing device also creates a slice name (SN) for each encoded data slice (EDS) in the set of encoded data slices. A typical format for a slice name 80 is shown in FIG. 17. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 18:
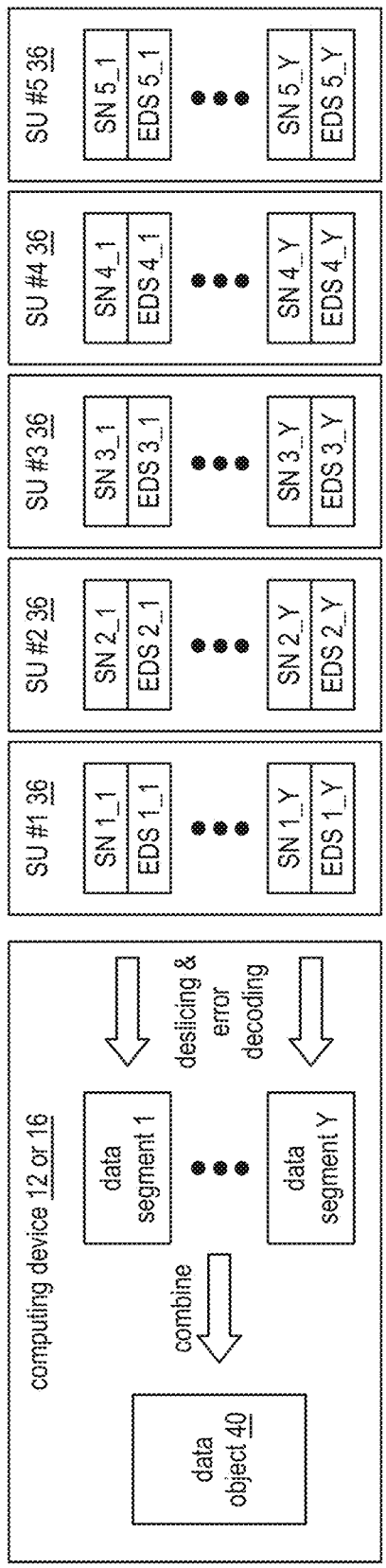
FIG. 18 is a schematic block diagram of an example of dispersed storage error decoding of data in accordance with the present invention.

FIG. 18 is a schematic block diagram of an example of dispersed storage error decoding of a data object that was dispersed storage error encoded and stored in the example of FIG. 14. In this example, the computing device 12 or 16 retrieves from the storage units at least the decode threshold number of encoded data slices per data segment. As a specific example, the computing device retrieves a read threshold number of encoded data slices.

Figure 19:
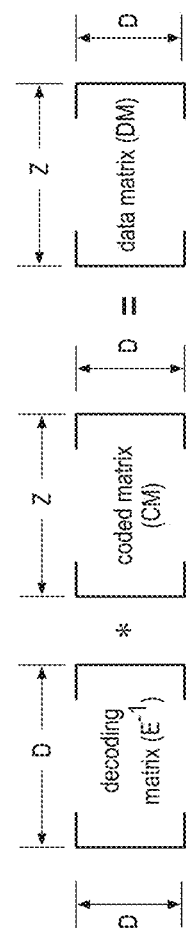
FIG. 19 is a schematic block diagram of a generic example of an error decoding function in accordance with the present invention.

To recover a data segment from a decode threshold number of encoded data slices, the computing device uses a decoding function as shown in FIG. 19. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 20:
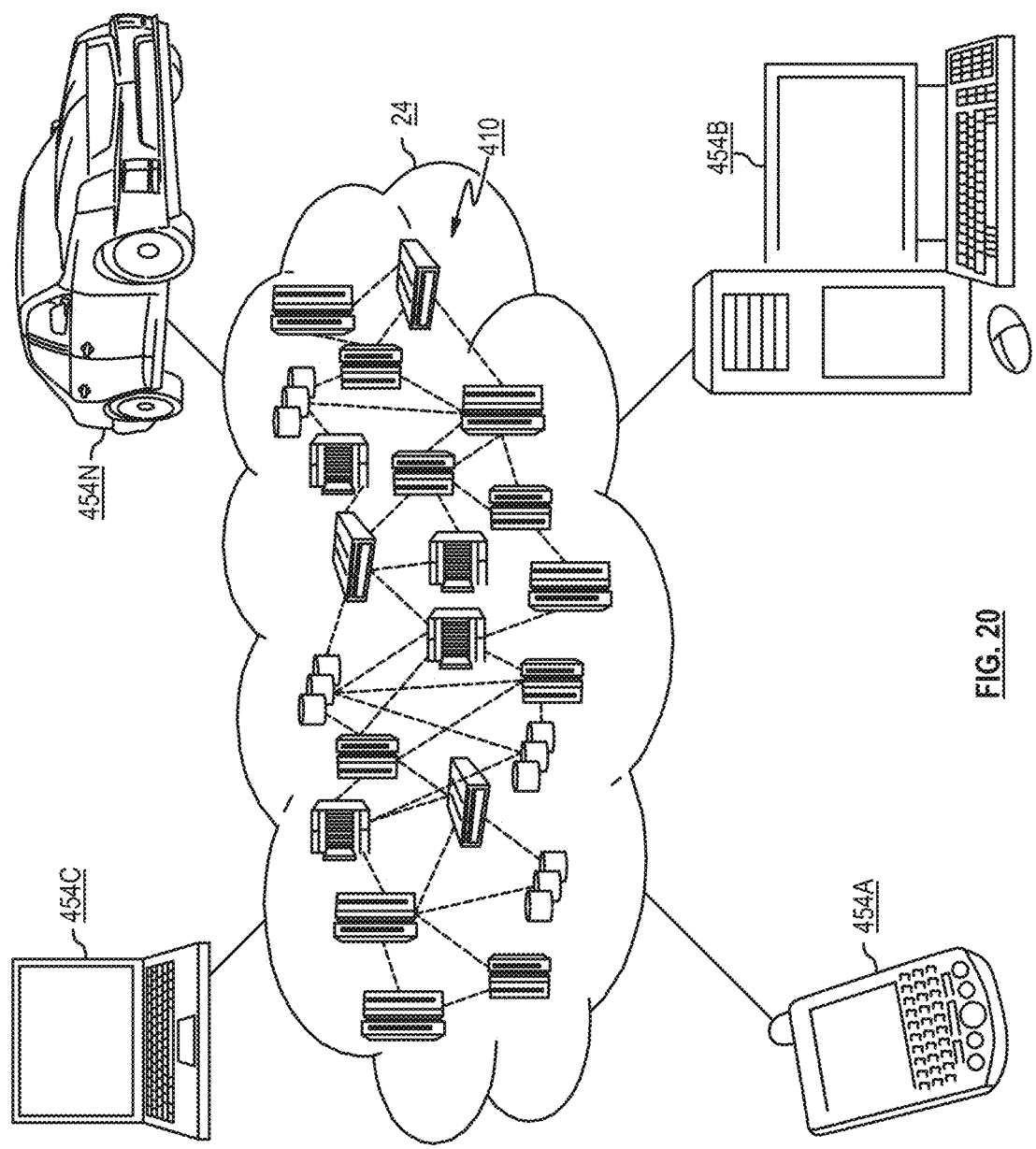
FIG. 20 depicts a cloud computing environment according to various embodiments of the present invention.

FIG. 20 depicts a cloud computing environment 2100 according to various embodiments of the present invention. FIG. 20 presents an illustrative cloud computing environment 24. As shown, cloud computing environment 24 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 24 to offer infrastructure, platforms and/or software as services for which a cloud consumer does not need to maintain resources on a local computing device. It is understood that the types of computing devices 454A-N shown in FIG. 20 are intended to be illustrative only and that computing nodes 410 and cloud computing environment 24 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 21 depicts abstraction model layers 2200 according to various embodiments of the present invention. Referring now to FIG. 21, a set of functional abstraction layers provided by cloud computing environment 24 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468. In some embodiments, one or more hardware components can be implemented by utilizing the computing device 1301 of FIG. 22.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and key identifiers (IDs) for use in accordance with operations based on communication system and communications related to one or more Key Management Systems (KMSs) that operates based on one or more Oblivious Pseudorandom Functions (OPRFs) 496.

Figure 22:
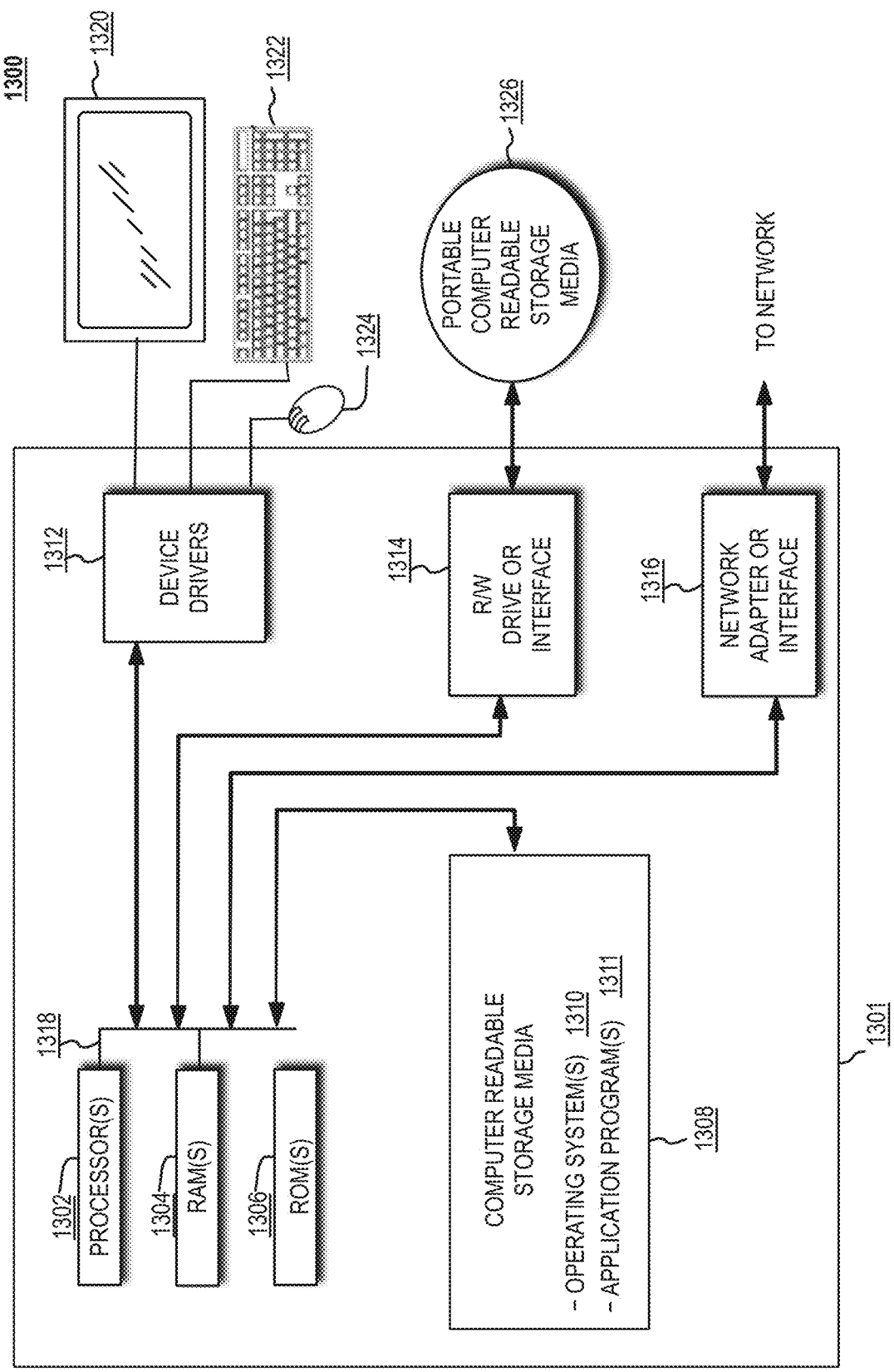
FIG. 22 depicts a block diagram of a computing device according to various embodiments of the present invention.

FIG. 22 depicts a block diagram 1300 of a computing device according to various embodiments of the present invention. FIG. 22 depicts a block diagram of components of a computing device 1301, which can be utilized to implement some or all of the cloud computing nodes 410, some or all of the computing devices 454A-N of FIG. 20, and/or to implement other computing devices described herein in accordance with an embodiment of the present invention. It should be appreciated that FIG. 22 provides only an illustration of one implementation and does not imply any limitations with regard to the environments in which different embodiments may be implemented. Many modifications to the depicted environment may be made.

Computing device 1301 can include one or more processors 1302, one or more computer-readable RAMs 1304, one or more computer-readable ROMs 1306, one or more computer readable storage media 1308, device drivers 1312, read/write drive or interface 1314, and network adapter or interface 1316, all interconnected over a communications fabric 1318. Communications fabric 1318 can be implemented with any architecture designed for passing data and/or control information between processors (such as microprocessors, communications and network processors, etc.), system memory, peripheral devices, and any other hardware components within the system.

One or more operating systems 1310 and/or application programs 1311, such as network application server software 467 and database software 468 of FIG. 21, are stored on one or more of the computer readable storage media 1308 for execution by one or more of the processors 1302 via one or more of the respective RAMs 1304 (which typically include cache memory). In the illustrated embodiment, each of the computer readable storage media 1308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 1301 can also include a R/W drive or interface 1314 to read from and write to one or more portable computer readable storage media 1326. Application programs 1311 on computing devices 1301 can be stored on one or more of the portable computer readable storage media 1326, read via the respective R/W drive or interface 1314 and loaded into the respective computer readable storage media 1308.

Computing device 1301 can also include a network adapter or interface 1316, such as a TCP/IP adapter card or wireless communication adapter. Application programs 1311 on computing devices 454A-N can be downloaded to the computing device from an external computer or external storage device via a network (for example, the Internet, a local area network or other wide area networks or wireless networks) and network adapter or interface 1316. From the network adapter or interface 1316, the programs may be loaded into the computer readable storage media 1308. The network may comprise copper wires, optical fibers, wireless transmission, routers, firewalls, switches, gateway computers and edge servers.

Computing device 1301 can also include a display screen 1320, a keyboard or keypad 1322, and a computer mouse or touchpad 1324. Device drivers 1312 interface to display screen 1320 for imaging, to keyboard or keypad 1322, to computer mouse or touchpad 1324, and/or to display screen 1320 for pressure sensing of alphanumeric character entry and user selections. The device drivers 1312, R/W drive or interface 1314, and network adapter or interface 1316 can comprise hardware and software stored in computer readable storage media 1308 and/or ROM 1306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:
   receiving, via a communication interface of the computing device, via a dispersed or distributed storage network (DSN), and from another computing device, a signal that specifies designation of the computing device to process a write request based on a system configuration of a Decentralized, or Distributed, Agreement Protocol (DAP);
   receiving, via the communication interface, a request to process the write request based on the system configuration of the DAP;
   retrieving, via the communication interface, a current policy of storage units (SUs) that are associated with the write request, wherein the current policy of the SUs specifies a current connectivity among the SUs within the DSN;
   based on the current policy, configuring a data structure for processing the write request, wherein the configuring is based at least partially on one or more scaling triggers and further wherein the data structure includes at least a primary queue;
   determining whether the primary queue compares favorably to the one or more scaling triggers;
   in response to determining that the primary queue does not compare favorably to one or more scaling triggers, adding a first secondary queue to process the write request;
   determining whether the primary queue and the first secondary queue together compare favorably to one or more scaling triggers; and
   in response to determining that the primary queue and the first secondary queue do not compare favorably to one or more scaling triggers, adding a second secondary queue to process the write request.

2. The method of claim 1, wherein the one or more scaling triggers are selected from the group consisting of a system storage capacity, a delegate resource capacity, a number of items pressing in one or more queues, and a number of items pending to be entered into one or more queues.

3. The method of claim 2, wherein each of the one or more scaling triggers include an upper and a lower limit.

4. The method of claim 3, wherein the upper and lower limits are specified at a value chosen to prevent unfavorable addition and subtraction of one or more secondary queues.

5. The method of claim 1 further comprises:
   after adding a second secondary queue determining, by the computing device, whether the primary queue and the first secondary queue compare favorably to one or more scaling triggers; and
   in response to determining that the primary queue and the first secondary queue compare favorably to one or more scaling triggers, removing the second secondary from write request processing.

6. The method of claim 1, wherein the determining that the primary queue does not compare favorably to one or more scaling triggers is based on metrics associated with the primary queue.

7. The method of claim 6, wherein adding of the first secondary queue is further based on a comparison between the metrics associated with the primary queue and one or more of the one or more scaling triggers.

8. The method of claim 1, wherein the configuring the data structure for processing the write request is further based at least partially on a load balancing strategy.

9. The method of claim 8 further comprises:
   receiving, via the communication interface of the computing device, metrics for use with the load balancing strategy, wherein the metrics are generated by a queue metrics engine (QME), wherein the QME tracks attributes of one or more queues, wherein the attributes are selected from a group consisting of queue tasks, queue performance, and queue reliability.

10. A computer readable memory comprises:
    a first memory element that stores operational instructions, which, when executed by a first computing device of a dispersed storage network (DSN), causes the first computing device to:
    receive, via a communication interface of the first computing device, via a dispersed or distributed storage network (DSN), and from another computing device, a signal that specifies designation of the computing device to process a write request based on a system configuration of a Decentralized, or Distributed, Agreement Protocol (DAP);
    receive, via the communication interface, a request to process the write request based on the system configuration of the DAP;
    retrieve, via the communication interface, a current policy of storage units (SUs) that are associated with the write request, wherein the current policy of the SUs specifies a current connectivity among the SUs within the DSN;
    based on the current policy, configure a data structure for processing the write request, wherein the configuring is based at least partially on one or more scaling triggers and further wherein the data structure includes at least a primary queue;
    determine whether the primary queue compares favorably to the one or more scaling triggers;
    in response to determining that the primary queue does not compare favorably to one or more scaling triggers, add a first secondary queue to process the write request;
    determine whether the primary queue and the first secondary queue together compare favorably to one or more scaling triggers; and
    in response to determining that the primary queue and the first secondary queue do not compare favorably to one or more scaling triggers, add a second secondary queue to process the write request.

11. The computer readable memory of claim 10, wherein the one or more scaling triggers are selected from the group consisting of a system storage capacity, a delegate resource capacity, a number of items pressing in one or more queues, and a number of items pending to be entered into one or more queues.

12. The computer readable memory of claim 10, wherein each of the one or more scaling triggers include an upper and a lower limit.

13. The computer readable memory of claim 12, wherein the upper and lower limits are specified at a value chosen to prevent unfavorable addition and subtraction of one or more secondary queues.

14. The computer readable memory of claim 10, wherein the first memory element further stores operational instructions, which, when executed by the first computing device of a dispersed storage network (DSN), causes the first computing device to:
- after adding a second secondary queue determine, by the computing device, whether the primary queue and the first secondary queue compare favorably to one or more scaling triggers; and
- in response to determining that the primary queue and the first secondary queue compare favorably to one or more scaling triggers, remove the second secondary from write request processing.

15. The computer readable memory of claim 10, wherein the determining that the primary queue does not compare favorably to one or more scaling triggers is based on metrics associated with the primary queue.

16. The computer readable memory of claim 15, wherein adding of the first secondary queue is further based on a comparison between the metrics associated with the primary queue and one or more of the one or more scaling triggers.

17. The computer readable memory of claim 10, wherein the configuring the data structure for processing the write request is further based at least partially on a load balancing strategy.

18. The computer readable memory of claim 10, wherein the first memory element further stores operational instructions, which, when executed by the first computing device of a dispersed storage network (DSN), causes the first computing device to:
- receive, via the communication interface of the computing device, metrics for use with a load balancing strategy, wherein the metrics are generated by a queue metrics engine (QME), wherein the QME tracks attributes of one or more queues, wherein the attributes are selected from a group consisting of queue tasks, queue performance, and queue reliability.

19. A computer program product for scaling queues in a distributed storage network (DSN), the computer program product comprising a computer readable storage medium having program instructions embodied therewith, the program instructions executable by a computing device to cause the computing device to:
- receive, via a communication interface of the computing device, via the DSN, and from another computing device, a signal that specifies designation of the computing device to process a write request based on a system configuration of a Decentralized, or Distributed, Agreement Protocol (DAP);
- receive, via the communication interface, a request to process the write request based on the system configuration of the DAP;
- retrieve, via the communication interface, a current policy of storage units (SUs) that are associated with the write request, wherein the current policy of the SUs specifies a current connectivity among the SUs within the DSN;
- based on the current policy, configure a data structure for processing the write request, wherein the configuring is based at least partially on one or more scaling triggers and further wherein the data structure includes at least a primary queue;
- determine whether the primary queue compares favorably to the one or more scaling triggers;
- in response to determining that the primary queue does not compare favorably to one or more scaling triggers, add a first secondary queue to process the write request;
- determine whether the primary queue and the first secondary queue together compare favorably to one or more scaling triggers; and
- in response to determining that the primary queue and the first secondary queue do not compare favorably to one or more scaling triggers, add a second secondary queue to process the write request.

20. The computer program product of claim 19, wherein the one or more scaling triggers are selected from the group consisting of a system storage capacity, a delegate resource capacity, a number of items pressing in one or more queues, and a number of items pending to be entered into one or more queues, and further wherein each of the one or more scaling triggers include an upper and a lower limit.

* * * * *